(12) United States Patent
Ohno et al.

(10) Patent No.: US 9,873,474 B2
(45) Date of Patent: Jan. 23, 2018

(54) VEHICLE

(71) Applicant: YAMAHA HATSUDOKI KABUSHIKI KAISHA, Iwata-shi, Shizuoka (JP)

(72) Inventors: Kohsuke Ohno, Shizuoka (JP); Takahiro Suzuki, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 15/279,772

(22) Filed: Sep. 29, 2016

(65) Prior Publication Data

US 2017/0088222 A1 Mar. 30, 2017

(30) Foreign Application Priority Data

Sep. 30, 2015 (JP) ................. 2015-194210

(51) Int. Cl.
*B62K 5/10* (2013.01)
*B60G 5/04* (2006.01)
*B62K 5/05* (2013.01)
*B62K 5/08* (2006.01)
*B60G 21/00* (2006.01)
(Continued)

(52) U.S. Cl.
CPC ............... *B62K 5/10* (2013.01); *B60G 5/04* (2013.01); *B60G 21/007* (2013.01); *B60R 19/02* (2013.01); *B62J 15/00* (2013.01); *B62K 5/027* (2013.01); *B62K 5/05* (2013.01); *B62K 5/08* (2013.01); *B60G 2200/44* (2013.01); *B60G 2204/4308* (2013.01); *B60G 2204/8302* (2013.01); *B60G 2300/122* (2013.01); *B60G 2300/45* (2013.01);
(Continued)

(58) Field of Classification Search
CPC . B62K 5/10; B62K 5/027; B62K 5/08; B62K 5/05; B62K 2005/001; B62J 15/00; B60R 2019/002; B60R 19/02; B60G 2204/8302; B60G 21/007; B60G 5/04; B60G 2300/45; B60G 2204/4308; B60G 2200/44; B60G 2300/122
See application file for complete search history.

(56) References Cited

U.S. PATENT DOCUMENTS 8,419,027 B2 * 4/2013 Ting .................... B62K 5/02
280/124.103
9,296,420 B2 * 3/2016 Sasaki .................. B62J 15/00
(Continued)

FOREIGN PATENT DOCUMENTS

EP    3 002 194 A1    4/2016
JP    5595624 B1      9/2014
(Continued)

*Primary Examiner* — Drew J Brown
(74) *Attorney, Agent, or Firm* — Keating and Bennett, LLP

(57) ABSTRACT

In a vehicle, a first left cover at least partially covers a lower edge of a left lower projection from the left in a left-right direction of a body frame at least temporarily when the body frame is caused to lean from an upright state to the right at a maximum angle, as viewed from the left in the left-right direction of the body frame. A first right cover at least partially covers a lower edge of a right lower projection from the right in the left-right direction of the body frame at least temporarily when the body frame is caused to lean from the upright state to the left at a maximum angle, as viewed from the right in the left-right direction of the body frame.

14 Claims, 12 Drawing Sheets

(51) Int. Cl.
  B60R 19/02   (2006.01)
  B62J 15/00   (2006.01)
  B62K 5/027   (2013.01)
  *B62K 5/00*   (2013.01)
  *B60R 19/00*   (2006.01)

(52) U.S. Cl.
  CPC ... *B60R 2019/002* (2013.01); *B62K 2005/001* (2013.01)

(56) References Cited

U.S. PATENT DOCUMENTS

| | | | |
|---|---|---|---|
| 9,352,798 B1* | 5/2016 | Hirayama | B62K 5/05 |
| 9,428,235 B2* | 8/2016 | Takano | B62K 5/08 |
| 9,688,339 B2* | 6/2017 | Hirayama | B62K 5/10 |
| 2004/0140645 A1* | 7/2004 | Hayashi | B62K 5/05 280/282 |
| 2005/0167174 A1* | 8/2005 | Marcacci | B60G 17/0152 180/76 |
| 2015/0298736 A1 | 10/2015 | Sasaki et al. | |
| 2016/0152291 A1 | 6/2016 | Sasaki et al. | |

FOREIGN PATENT DOCUMENTS

| | | |
|---|---|---|
| JP | 5597787 B1 * | 10/2014 |
| WO | 2015/002164 A1 | 1/2015 |

\* cited by examiner

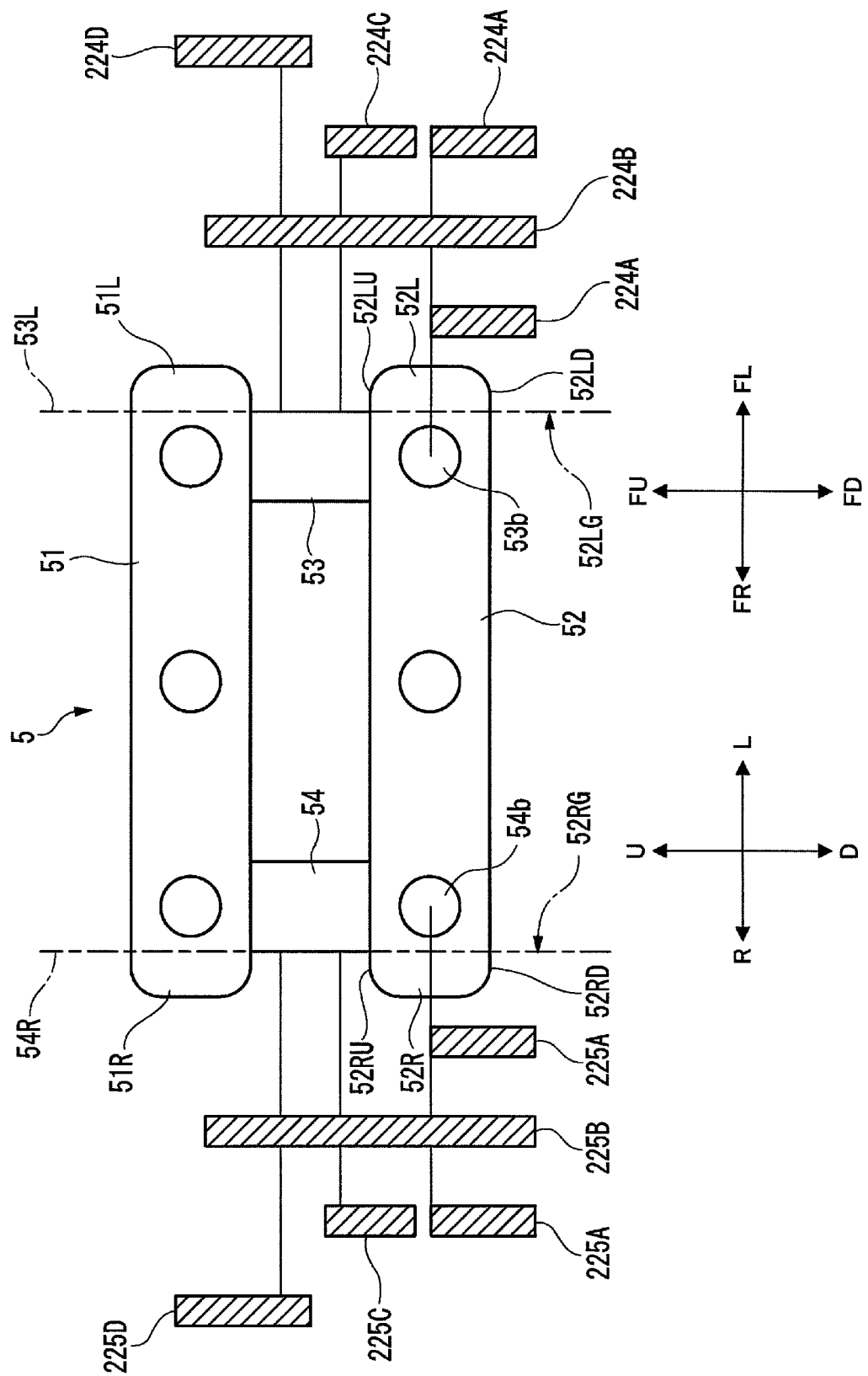

VEHICLE

BACKGROUND OF THE INVENTION

1. Field of the Invention

The present invention relates to a vehicle equipped with a leanable body frame and two front wheels.

2. Description of the Related Art

A vehicle described in, for example, Japanese Patent No. 5595624 includes a body frame and two front wheels that are arranged side by side in a left-right direction of the body frame.

The vehicle includes a linkage. The linkage includes an upper cross member, a lower cross member, a left side member and a right side member. The upper cross member, the lower cross member, the left side member and the right side member are connected so that the upper cross member and the lower cross member maintain postures that are parallel to each other and the left side member and the right side member maintain postures that are parallel to each other.

In the vehicle described above, a position of a left end of the lower cross member substantially coincides with a left end of the left side member in a left-right direction of the body frame that is standing upright or in an upright state. Similarly, a position of a right end of the lower cross member substantially coincides with a right end of the right side member in the left-right direction of the body frame that is in the upright state.

There is a need to enhance the rigidity at a connector between the lower cross member and the left side member and a connector between the lower cross member and the right side member. In order to enhance the rigidity at those connectors, it is considered to extend the left end of the lower cross member to the left of the left end of the left side member and to extend the right end of the lower cross member to the right of the right end of the right side member. By doing so, the thickness of the portion of the lower cross member that is disposed on the left of the connector with the left side member is increased to enhance the rigidity at the connector concerned. Likewise, the thickness of the portion of the lower cross member that is disposed on the right of the connector with the right side member is increased to enhance the rigidity at the connector concerned. In the following description, the portion of the lower cross member that is disposed on the left of the left end of the left side member will be referred to as a left lower projection, and the portion of the lower cross member that is disposed on the right of the right end of the right side member will be referred to as a right lower projection.

In the case of the lower cross member including the left lower projection and the right lower projection that are described above, when the linkage operates, there could be a case that foreign matter such as stones that come flying from a side is caught thereat. For example, when the body frame leans to the right of the vehicle, an angle defined between a lower edge of the left lower projection and the left end of the left side member is narrowed when viewed from the front of the vehicle, such that there could be a case that foreign matter such as stones that enter the linkage is caught therebetween. Likewise, when the body frame leans to the left of the vehicle, an angle defined between a lower edge of the right lower projection and the right end of the right side member is narrowed when viewed from the front of the vehicle, such that there could be a case that foreign matter such as stones that enter the linkage is caught therebetween. Consequently, there is a need to prevent or significantly reduce the intrusion of foreign matter such as stones into the linkage by covering the portions where the foreign matter such as stones might intrude into the linkage with a cover.

The vehicle described in Japanese Patent No. 5595624 includes a front cover that does not change its position relative to the body frame. The linkage is covered by the front cover when the vehicle is standing upright. For example, in order to prevent or significantly reduce the intrusion of foreign matter such as stones into the linkage, it is conceivable that the shape of the front cover is changed so as to cover the portions described above where the foreign matter such as stones might intrude into the linkage.

However, as the body frame leans, the left side member or the right side member of the linkage is displaced downwards relative to the front cover. As the left side member or the right side member is displaced, the portions where the foreign matter might intrude into the linkage also moves downwards. In order to cover the portions with the front cover, a lower end of the front cover needs to be extended downwards to a large extent. If this is done, it is inevitable that the front cover is enlarged (and hence, the front portion of the vehicle is enlarged) and additionally, there could be a case that the left and right front wheels and their peripheral members (the suspensions and the front mudguards) interfere with the extended lower end of the front cover. Then, when attempting to ensure a space to avoid the interference, the front cover (and hence, the front portion of the vehicle) is also enlarged in the front-rear direction and the left-right direction.

SUMMARY OF THE INVENTION

Preferred embodiments of the present invention prevent the enlargement in size of the front portion of the vehicle while enabling the prevention or reduction of intrusion of foreign matter into the linkage.

According to a preferred embodiment of the present invention, a vehicle includes a body frame; a left front wheel and a right front wheel that are arranged side by side in a left-right direction of the body frame; and a linkage disposed above the left front wheel and the right front wheel in an up-down direction of the body frame, and that changes positions of the left front wheel and the right front wheel relative to the body frame to cause the body frame to lean to left or right of the vehicle, wherein the linkage includes an upper cross member, a lower cross member, a left side member and a right side member; the upper cross member, the lower cross member, the left side member and the right side member are connected such that the upper cross member and the lower cross member maintain postures that are parallel to each other, and such that the left side member and the right side member maintain postures that are parallel to each other; the vehicle further includes a left suspension supporting the left front wheel and supported on the left side member; a right suspension supporting the right front wheel and supported on the right side member; a first left cover attached to one of the left side member and the left suspension; and a first right cover attached to one of the right side member and the right suspension; the lower cross member includes a left lower projection disposed on the left of a left end of the left side member; and a right lower projection disposed on the right of a right end of the right side member; the first left cover at least partially covers a lower edge of the left lower projection from the left in the left-right direction of the body frame at least temporarily when the body frame is caused to lean from an upright state to the right at a maximum angle, as viewed from the left in the left-right direction of the body frame; and the first right cover at least partially covers a lower edge of the right lower projection from the right in the left-right direction of the body frame at least temporarily when the body frame is caused to lean from the upright state to the left at a maximum angle, as viewed from the right in the left-right direction of the body frame.

The inventors of preferred embodiments of the present invention conceived that the above advantages and benefits could be achieved by attaching the first left cover to one of the left side member and the left suspension and by attaching the first right cover to one of the right side member and the right suspension. As mentioned above, the first left cover at least partially covers a lower edge of the left lower projection from the left in the left-right direction of the body frame at least temporarily when the body frame is caused to lean from an upright state to the right at a maximum angle, as viewed from the left in the left-right direction of the body frame. The first right cover at least partially covers a lower edge of the right lower projection from the right in the left-right direction of the body frame at least temporarily when the body frame is caused to lean from the upright state to the left at a maximum angle, as viewed from the right in the left-right direction of the body frame.

According to the above configuration, as the linkage operates, the first left cover is displaced together with the left side member or the left suspension relative to the body frame, and the first right cover is displaced together with the right side member or the right suspension relative to the body frame. In other words, the relative position of the first left cover to the left side member or the left suspension and the relative position of the first right cover to the right side member or the right suspension do not change substantially even though the linkage operates. Consequently, the first left cover and the first right cover do not have to cover the entire moving area of the portion that needs to be protected from foreign matter such as stones that come flying from the side and hence should have a required minimum area. In addition, since the relative positions do not change substantially even though the linkage operates, there is no need to consider the interference of the first left cover with the left side member or the left suspension and the interference of the first right cover with the right side member or the right suspension. Consequently, the first left cover and the first right cover are easily disposed closely to the portion required to be protected. As a result, it is possible to prevent the enlargement in size of the front portion of the vehicle while enabling the prevention or reduction of intrusion of foreign matter into the linkage.

The above vehicle may be configured as follows. The left suspension includes a left outer portion extending in the left-right direction of the body frame as far as on the left of the left end of the left side member. The right suspension includes a right outer portion extending in the left-right direction of the body frame as far as on the right of the right end of the right side member. The first left cover covers a region defined by the lower edge of the left lower projection and an upper edge of the left outer portion at least from the left in the left-right direction of the body frame at least temporarily when the body frame is caused to lean from the upright state to the right at the maximum angle, as viewed from the left in the left-right direction of the body frame. The first right cover covers a region defined by the lower edge of the right lower projection and an upper edge of the right outer portion at least from the right in the left-right direction of the body frame at least temporarily when the body frame is caused to lean from the upright state to the left at the maximum angle, as viewed from the right in the left-right direction of the body frame.

In the case of the left suspension including the left outer portion, when the body frame leans to the right from the upright state, there is a possibility that foreign matter intrudes into a space between the left outer portion and the left side member. According to the configuration described above, the intrusion of the foreign matter into the portion concerned is prevented or significantly reduced by the first left cover.

Likewise, in the case of the right suspension including the right outer portion, when the body frame leans to the left from the upright state, there is a possibility that foreign matter intrudes into a space between the right outer portion and the right side member. According to the configuration described above, the intrusion of the foreign matter into the portion concerned is prevented or significantly reduced by the first right cover.

As a result, it is possible to further prevent the enlargement in size of the front portion of the vehicle while enabling the prevention or reduction of intrusion of foreign matter into the linkage.

In this case, the above vehicle may be configured as follows. The first left cover is attached to the left outer portion of the left suspension. The first right cover is attached to the right outer portion of the right suspension.

By disposing the first left cover in the way described above, it is easy to prevent or significantly reduce the intrusion of foreign matter in a position that is spaced to the left from the linkage. Likewise, by disposing the first right cover in the way described above, it is easy to prevent or significantly reduce the intrusion of foreign matter in a position that is spaced to the right from the linkage. Consequently, it is possible to prevent the enlargement in size of the front portion of the vehicle while preventing or reducing the intrusion of foreign matter into the linkage more efficiently.

As another example wherein the first left cover is attached to the left suspension and the right cover is attached to the right suspension, the above vehicle may be configured as follows. The left suspension includes a left upper portion supported on the left side member; and a left lower portion supporting the left front wheel and movable upward and downward relative to the left upper portion. The right suspension includes a right upper portion supported on the right side member; and a left lower portion supporting the right front wheel and movable upward and downward relative to the right upper portion. The first left cover is attached to the left upper portion. The first right cover is attached to the right upper portion.

The above vehicle may be configured as follows. The left suspension is supported on the left side member so as to be able to turn relative to the left side member. The right suspension is supported on the right side member so as to be able to turn relative to the right side member. The vehicle further includes a steering member connected to the body frame so as to be able to turn about a steering axis; and a steering force transmission that turns the left suspension and the right suspension in a direction that the steering member is turned. The first left cover is attached to the left suspension. The first right cover is attached to the right suspension.

According to this configuration, the first left cover and the first right cover follow the turning of the left suspension and the right suspension as a result of the operation of the steering member in addition to the operation of the linkage. Relative postures of the left side member and the left suspension changes in accordance with the turning. Thus, foreign matter might intrude into a space between the left side member and the left suspension as well. Similarly, relative postures of the right side member and the right suspension change in accordance with the turning. Thus, foreign matter might intrude into a space between the right side member and the right suspension as well. According to the configuration described above, the first left cover and the first right cover that are displaced together with the left side member and the right side member, respectively, also protect the portions concerned. Consequently, it is possible to prevent the enlargement in size of the front portion of the vehicle while the intrusion of foreign matter into the linkage is further prevented or significantly reduced.

The above vehicle may be configured as follows. The lower cross member is connected to a lower intermediate connector of the body frame so as to be able to turn about a lower intermediate connecting axis. The lower cross member includes a front element disposed directly ahead of the lower intermediate connector in a direction following the lower intermediate connecting axis; and a rear element directly behind the lower intermediate connector in the direction following the lower intermediate connecting axis. The left lower projection includes a left connector connecting the front element and the rear element at a position directly on the left of the left side member in the left-right direction of the body frame. The right lower projection includes a right connector connecting the front element and the rear element at a position directly on the right of the right side member in the left-right direction of the body frame. The first left cover covers a portion where a lower edge of the left connector overlaps the left side member at least from the left in the left-right direction of the body frame, as viewed from the left in the left-right direction of the body frame. The first right cover covers a portion where a lower edge of the right connector overlaps the right side member at least from the right in the left-right direction of the body frame, as viewed from the right in the left-right direction of the body frame.

Providing the left connector improves the rigidity of the connector between the lower cross member and the left side member. On the other hand, when the body frame is caused to lean to the right from the upright state, there is the possibility that foreign matter intrudes into a space between the lower edge of the left connector and the left side member. According to the configuration described above, the intrusion of the foreign matter into the portion concerned is prevented or significantly reduced by the first left cover.

Providing the right connector improves the rigidity of the connector between the lower cross member and the right side member. On the other hand, when the body frame is caused to lean to the left from the upright state, there is the possibility that foreign matter intrudes into a space between the lower edge of the right connector and the right side member. According to the configuration described above, the intrusion of the foreign matter into the portion concerned is prevented or significantly reduced by the first right cover.

As a result, it is possible to prevent the enlargement in size of the front portion of the vehicle while preventing or reducing the intrusion of foreign matter into the linkage whose rigidity is enhanced.

In this case, the above vehicle may be configured as follows. The first left cover covers the portion where the lower edge of the left connector overlaps the left side member at least from the left in the left-right direction of the body frame at least temporarily when the body frame is caused to lean from the upright state to the right at the maximum angle, as viewed from the left in the left-right direction of the body frame. The first right cover covers the portion where the lower edge of the right connector overlaps the right side member at least from the right in the left-right direction of the body frame at least temporarily when the body frame is caused to lean from the upright state to the left at the maximum angle, as viewed from the right in the left-right direction of the body frame.

According to this configuration, by using the first left cover and the first right cover that have the required minimum area, it is possible to prevent or significantly reduce the intrusion of foreign matter into the linkage even though the incoming direction of the foreign matter changes in accordance with the leaning angle of the body frame. Consequently, it is possible to further prevent the enlargement in size of the front portion of the vehicle while preventing or reducing the intrusion of foreign matter into the linkage whose rigidity is enhanced.

In this case, the above vehicle may include a second left cover that covers a portion where an upper edge of the left connector overlaps the left side member at least from the left in the left-right direction of the body frame at least temporarily when the body frame is caused to lean from the upright state to the left at the maximum angle, as viewed from the left in the left-right direction of the body frame; and a second right cover that covers a portion where an upper edge of the right connector overlaps the right side member at least from the right in the left-right direction of the body frame at least temporarily when the body frame is caused to lean from the upright state to the right at the maximum angle, as viewed from the right in the left-right direction of the body frame.

Providing the left connector may result in the possibility that foreign matter intrudes into the linkage also from a portion located between the upper edge of the left connector and the left side member when the body frame leans from the upright state to the left. According to the configuration described above, the intrusion of the foreign matter into the portion concerned is prevented or significantly reduced by the second left cover.

Providing the right connector may result in the possibility that foreign matter intrudes into the linkage also from a portion located between the upper edge of the right connector and the right side member when the body frame leans from the upright state to the right. According to the configuration described above, the intrusion of the foreign matter into the portion concerned is prevented or significantly reduced by the second right cover.

As a result, it is possible to prevent the enlargement in size of the front portion of the vehicle while preventing or further reducing the intrusion of foreign matter into the linkage whose rigidity is enhanced.

The above vehicle may include a front cover provided so as not to be movable relative to the body frame, and at least partially covering the linkage. In this case, the above vehicle may be configured as follows. The first left cover is at least partially positioned inside of the front cover at least temporarily when the body frame is caused to lean from the upright state to the left at the maximum angle. The first right cover is at least partially positioned inside of the front cover at least temporarily when the body frame is caused to lean from the upright state to the right at the maximum angle.

According to this configuration, since one function of the front cover to prevent or significantly reduce the intrusion of foreign matter into the linkage is assigned to the first left cover and the first right cover, the front cover itself is small in size. In addition, when the body frame leans from the upright state, the left side member, the left suspension, the right side member and the right suspension are displaced farther inwards in the left-right direction of the body frame than positions they take when the body frame is in the upright state. This displaces the first left cover and the first right cover farther inwards in the left-right direction of the body frame than positions they take when the body frame is in the upright state. Consequently, the necessity is reduced of ensuring a larger space within the front cover so as to avoid the interference with the first left cover and the first right cover. This fact also contributes to the reduction in size of the front cover. As a result, it is possible to further prevent the enlargement in size of the front portion of the vehicle while preventing or further reducing the intrusion of foreign matter into the linkage.

In this case, the above vehicle may be configured as follows. An upper edge of the left lower projection is at least partially covered with the front cover at least when the body frame is caused to lean to the left at the maximum angle, as viewed from the left in the left-right direction of the body frame. An upper edge of the right lower projection is at least partially covered with the front cover at least when the body frame is caused to lean to the right at the maximum angle, as viewed from the right in the left-right direction of the body frame.

According to this configuration, at least in such a state that the body frame leans to the left at the maximum leaning angle, the function to prevent or significantly reduce the intrusion of foreign matter into the portion between the upper edge of the left lower projection and the left side member is assigned from the first left cover to the front cover. In other words, the first left cover does not have to have such a size that it continues to cover the upper edge of the left lower projection until the body frame is caused to lean to the left at the maximum angle. Consequently, it is possible to prevent the enlargement in size of the first left cover.

Similarly, at least in such a state that the body frame leans to the right at the maximum leaning angle, the function to prevent or significantly reduce the intrusion of foreign matter into the portion between the upper edge of the right lower projection and the right side member is assigned from the first right cover to the front cover. In other words, the first right cover does not have to have such a size that it continues to cover the upper edge of the right lower projection until the body frame is caused to lean to the right at the maximum angle. Consequently, it is possible to prevent the enlargement in size of the first right cover.

As a result, it is possible to further prevent the enlargement in size of the front portion of the vehicle while preventing or further reducing the intrusion of foreign matter into the linkage.

Alternatively, the above vehicle may be configured as follows. The first left cover at least partially covers an upper edge of the left lower projection from the left in the left-right direction of the body frame at least temporarily when the body frame is caused to lean from the upright state to the left at the maximum angle, as viewed from the left in the left-right direction of the body frame. The first right cover at least partially covers an upper edge of the right lower projection from the right in the left-right direction of the body frame at least temporarily when the body frame is caused to lean from the upright state to the right at the maximum angle, as viewed from the right in the left-right direction of the body frame.

In this case, the above vehicle may be configured as follows. The upper cross member includes a left upper projection disposed on the left of the left end of the left side member; and a right upper projection disposed on the right of the right end of the right side member. The first left cover at least partially covers the left upper projection from the left in the left-right direction of the body frame. The first right cover at least partially covers the right upper projection from the right in the left-right direction of the body frame.

Alternatively, the above vehicle may include a third left cover attached to the left side member, and that at least partially covers an upper edge of the left lower projection from the left in the left-right direction of the body frame at least temporarily when the body frame is caused to lean from the upright state to the left at the maximum angle, as viewed from the left in the left-right direction of the body frame; and a third right cover attached to the right side member, and that at least partially covers an upper edge of the right lower projection from the right in the left-right direction of the body frame at least temporarily when the body frame is caused to lean from the upright state to the right at the maximum angle, as viewed from the right in the left-right direction of the body frame.

According to this configuration, the portions where the intrusion of foreign matter into the linkage is desired to be prevented or significantly reduced is covered with covers having a minimum size. Consequently, it is possible to further prevent the enlargement in size of the front portion of the vehicle while preventing or reducing the intrusion of foreign matter into the linkage.

Alternatively, the above vehicle may be configured as follows. The upper cross member includes a left upper projection disposed on the left of the left end of the left side member; and a right upper projection disposed on the right of the right end of the right side member. The vehicle further includes a fourth left cover attached to the left side member, and at least partially covering the left upper projection from the left in the left-right direction of the body frame; and a fourth right cover attached to the right side member, and at least partially covering the right upper projection from the right in the left-right direction of the body frame.

According to this configuration, the portions where the intrusion of foreign matter into the linkage is desired to be prevented or significantly reduced are covered with covers having a minimum size. Consequently, it is possible to further prevent the enlargement in size of the front portion of the vehicle while preventing or reducing the intrusion of foreign matter into the linkage.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 12 is a schematic diagram showing modified examples of the left side cover and the right side cover.

DETAILED DESCRIPTION OF THE PREFERRED EMBODIMENTS

Figure 1:
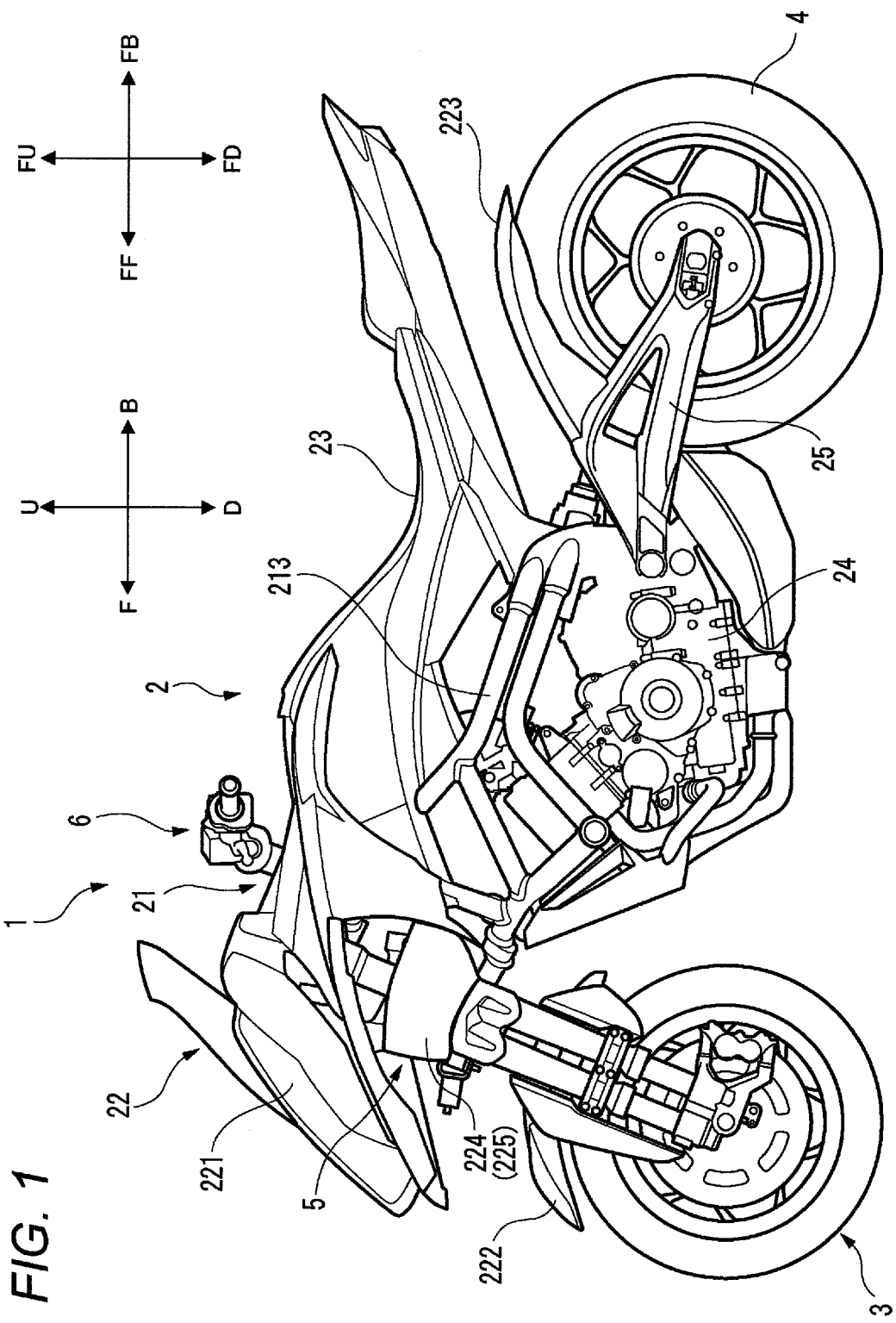
FIG. 1 is a left side view showing an entire vehicle according to a preferred embodiment of the present invention.

Referring to the accompanying drawings, preferred embodiments of the present invention will be described in detail below.

In the accompanying drawings, an arrow F denotes a front or forward direction of a vehicle. An arrow B denotes a back/rear or backward/rearward direction of the vehicle. An arrow U denotes an up or upward direction of the vehicle. An arrow D denotes a down or downward direction of the vehicle. An arrow R denotes a right or rightward direction of the vehicle. An arrow L denotes a left or leftward direction of the vehicle.

A vehicle turns with a body frame being caused to lean to the left or right of the vehicle from a vertical direction. In addition to the directions based on the vehicle, directions based on the body frame will be defined. In the accompanying drawings, an arrow FF denotes a front or forward direction of the body frame. An arrow FB denotes a back/rear or backward/rearward of the body frame. An arrow FU denotes an up or upward direction of the body frame. An arrow FD denotes a down or downward direction of the body frame. An arrow FR denotes a right or rightward direction of the body frame. An arrow FL denotes a left or leftward direction of the body frame.

In this description, a "front-rear direction of the body frame," a "left-right direction of the body frame" and an "up-down direction of the body frame" mean a front-rear direction, a left-right direction and an up-down direction based on the body frame when viewed from a rider who rides the vehicle. "A side of or sideways of the body frame" means directly on the right or left in the left-right direction of the body frame.

In this description, an expression "extending in the front-rear direction of the vehicle body frame" includes a fact that it extends while being inclined in relation to the front-rear direction of the vehicle body frame and means that it extends in a direction closer to the front-rear direction of the vehicle body frame than the left-right direction and up-down direction of the vehicle body frame.

In this description, an expression "extending in the left-right direction of the vehicle body frame" includes a fact that it extends while being inclined in relation to the left-right direction of the vehicle body frame and means that it extends in a direction closer to the left-right direction of the vehicle body frame than the front-rear direction and up-down direction of the vehicle body frame.

In this description, an expression "extending in the up-down direction of the vehicle body frame" includes a fact that it extends while being inclined in relation to the up-down direction of the vehicle body frame and means that it extends in a direction closer to the up-down direction of the vehicle body frame than the left-right direction and front-rear direction of the vehicle body frame.

In this description, an expression reading the "vehicle is standing upright or in an upright state" or the "body frame is standing upright or in the upright state" mean a state in which the vehicle is not steered at all and the up-down direction of the body frame coincides with the vertical direction. In this state, the directions based on the vehicle coincide with the directions based on the body frame. When the vehicle is turning with the body frame caused to lean to the left or right from the vertical direction, the left-right direction of the vehicle does not coincide with the left-right direction of the body frame. Similarly, the up-down direction of the vehicle does not coincide with the up-down direction of the body frame. However, the front-rear direction of the vehicle coincides with the front-rear direction of the body frame.

In this description, an expression reading "directly on the left of a member A in the left-right direction of the body frame" denotes a space through which the member A passes when the member A is translated to the left in the left-right direction of the body frame. An expression reading "directly on the right of the member A" is also defined in the same way.

In this description, an expression reading "on the left of the member A in the left-right direction of the body frame" includes not only the space through which the member A passes when the member A is translated to the left in the left-right direction of the body frame but also a space which expands from the space in directions which are at right angles to the left-right direction of the body frame. An expression reading "on the right of the member A" is also defined in the same way.

In this description, an expression reading "directly above the member A in the up-down direction of the body frame" denotes a space through which the member A passes when the member A is translated upwards in the up-down direction of the body frame. An expression reading "directly below the member A" is also defined in the same way.

In this description, an expression reading "above the member A in the up-down direction of the body frame" includes not only the space through which the member A passes when the member A is translated upwards in the up-down direction of the body frame but also a space which expands from the space in directions which are at right angles to the up-down direction of the body frame. An expression reading "below the member A" is also defined in the same way.

In this description, an expression reading "directly ahead of the member A in the front-rear direction of the body frame" denotes a space through which the member A passes when the member A is translated to the front in the front-rear direction of the body frame. An expression reading "directly behind the member A" is also defined in the same way.

In this description, an expression reading "ahead of the member A in the front-rear direction of the body frame" includes not only the space through which the member A passes when the member A is translated to the front in the front-rear direction of the body frame but also a space which expands from the space in directions which are at right angles to the front-rear direction of the body frame. An expression reading "behind the member A" is also defined in the same way.

In this description, "rotation, rotating or rotated" means that a member is displaced at an angle of 360 degrees or more about an axis thereof. In this description, "turn, turning or turned" means that a member is displaced at an angle less than 360 degrees about an axis thereof.

In this description, an expression reading a member "is attached" includes a case where the member is attached directly to another member and a case where the member is attached indirectly to another member via a different member.

Referring to FIGS. 1 to 11, a vehicle 1 according to a preferred embodiments of the present invention will be described. As shown in FIG. 1, the vehicle 1 includes a vehicle main body 2, two front wheels 3, a rear wheel 4, a linkage 5 and a steering member 6. The vehicle 1 includes a leanable body frame and the two front wheels 3 arranged side by side in the left-right direction of the body frame.

The vehicle main body 2 includes a body frame 21, a body cover 22, a seat 23, an engine unit 24, and a rear arm 25.

In FIG. 1, the body frame 21 is in the upright state. The following description to be made while referring to FIG. 1 is based on the premise that the body frame 21 is in the upright state. FIG. 1 is a left side view resulting when the entire vehicle 1 is viewed from the left in the left-right direction of the body frame 21.

Figure 2:
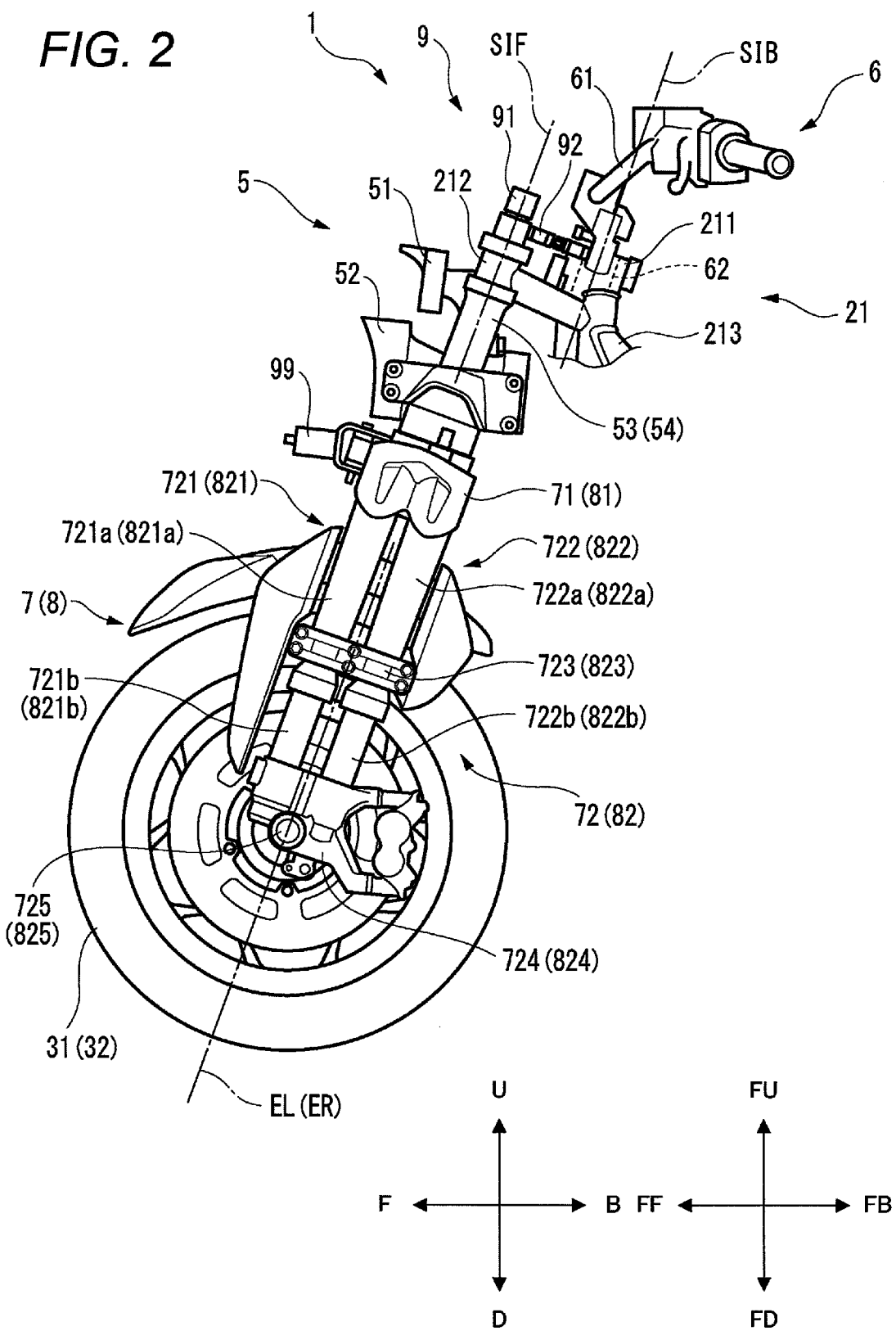
FIG. 2 is a left side view showing a front portion of the vehicle of FIG. 1 in an enlarged manner.

FIG. 2 is a view when a front portion of the vehicle 1 is viewed from the left in the left-right direction of the body frame 21. In FIG. 2, the body frame 21 is in the upright state. The following description to be made while referring to FIG. 2 is based on the premise that the body frame 21 is in the upright state.

The body frame 21 includes a head pipe 211, a link support 212 and a main frame 213. The head pipe 211 supports the steering member 6. The link support 212 supports the linkage 5. The main frame 213 supports the seat 23, the engine unit 24 and the rear arm 25.

The rear arm 25 is disposed directly behind the main frame 213 in the front-rear direction of the body frame 21. The rear arm 25 extends in the front-rear direction of the body frame 21. A front end of the rear arm 25 is supported by the main frame 213 and the engine unit 24 and is able to turn about an axis that extends in the left-to-rear direction of the body frame 21. A rear end of the rear arm 25 supports the rear wheel 4.

The body cover 22 is a body portion that covers at least a portion of a group of constituent elements that define the vehicle 1. The body cover 22 includes a front cover 221, a pair of left and right front fenders 222, a rear fender 223, a left side cover 224 and a right side cover 225. In FIG. 2, the front cover 221, the left side cover 224 and the right side cover 225 are omitted from illustration.

The front cover 221 is disposed directly ahead of the seat 23 in the front-rear direction of the body frame 21. The front cover 221 covers the linkage 5, the steering member 6 and at least a portion of a steering force transmission 9.

At least portions of the pair of left and right front fenders 222 are individually disposed directly below the front cover 221. At least portions of the pair of left and right front fenders 222 are disposed directly above the pair of left and right front wheels 3, respectively.

At least a portion of the rear wheel 4 is disposed below the seat 23 in the up-down direction of the body frame 21. At least a portion of the rear wheel 4 is disposed directly below the rear fender 223 in the up-down direction of the body frame 21.

The left side cover 224 is disposed ahead of the seat 23 in the front-rear direction of the body frame 21. The left side cover 224 covers the linkage 5, the steering member 6 and at least a portion of a steering force transmission 9.

The right side cover 225 is disposed ahead of the seat 23 in the front-rear direction of the body frame 21. The right side cover 225 covers the linkage 5, the steering member 6 and at least a portion of the steering force transmission 9. The right side cover 225 is invisible from a viewpoint of FIG. 1. The position where the right side cover 225 is disposed when viewed from the right of the vehicle 1 is symmetrical with the position where the left side cover 224 is disposed when viewed from the left of the vehicle 1 in relation to the front-rear direction. Thus, individual illustration of the right side cover 225 is omitted, and only reference numerals related thereto will be shown in the figure.

The vehicle 1 according to the present preferred embodiment is a vehicle on which a rider mounts in a posture of straddling the body frame 21. Namely, when riding the vehicle 1, a portion of the body frame 21, which is disposed ahead of the seat 23 on which the rider sits in the front-rear direction of the body frame 21, is disposed between the legs of the rider. The rider rides on the vehicle 1 in a posture of holding the main frame 213 that is positioned ahead of the seat 23 in the front-rear direction of the body frame 21 by the legs therebetween.

When viewing the vehicle 1 from the left-right direction of the body frame 21, the engine unit 24 is disposed ahead of a front end of the rear wheel 4 in the front-rear direction of the body frame 21. The engine unit 24 is disposed so as not to be movable relative to the body frame 21. The engine unit 24 is disposed so as not to be movable relative to the main frame 213. The engine 24 produces power to drive the vehicle 1. The driving force produced is transmitted to the rear wheel 4.

The head pipe 211 is disposed at a front portion of the vehicle 1. When viewing the vehicle 1 from the left in the left-right direction of the body frame 21, an upper portion of the head pipe 211 is disposed behind a lower portion of the head pipe 211 in the front-rear direction of the body frame 21.

The steering member 6 includes a handlebar 61 and an upstream steering shaft 62. The upstream steering shaft 62 extends downwards from a central portion of the handlebar 61 in the left-right direction. The upstream steering shaft 62 is supported on the head pipe 211 so as to turn about a rear intermediate steering axis SIB.

The link support 212 is disposed directly ahead of the head pipe 211 in the front-rear direction of the body frame 21. When viewing the vehicle 1 from the left in the left-right direction of the body frame 21, an upper portion of the link support 212 is disposed behind a lower portion of the link support 212 in the front-rear direction of the body frame 21.

Figure 3:
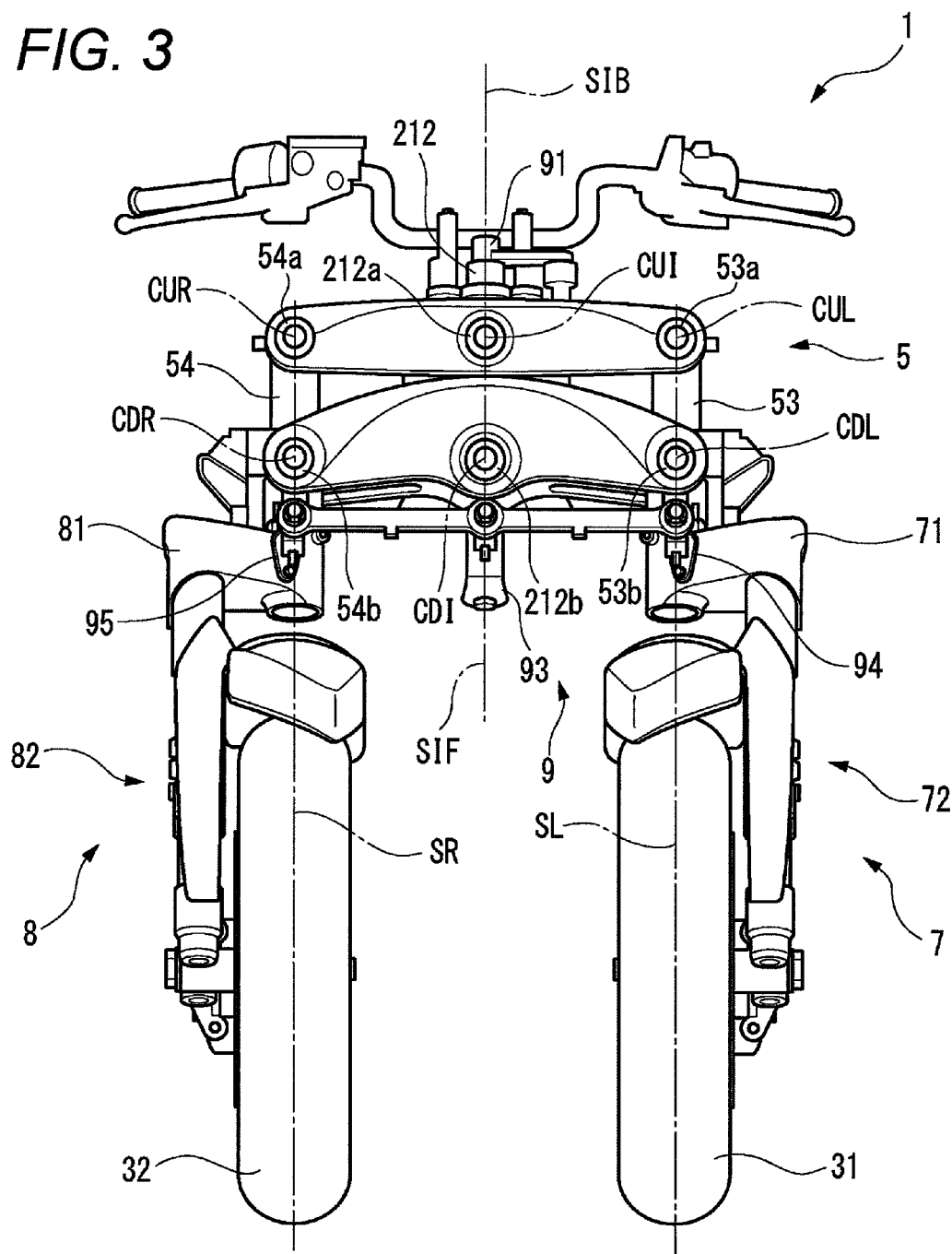
FIG. 3 is a front view showing the front portion of the vehicle of FIG. 1.

FIG. 3 is a front view of the front portion of the vehicle 1 when viewed from the front in the front-rear direction of the body frame 21. In FIG. 3, the body frame 21 is in the upright state. The following description to be made while referring to FIG. 3 is based on the premise that the body frame 21 is in the upright state. In FIG. 3, the front cover 221, the left side cover 224 and the right side cover 225 are omitted from illustration.

The two front wheels 3 include a left front wheel 31 and a right front wheel 32. The left front wheel 31 is disposed on the left of the head pipe 211 and the link support 212 which define a portion of the body frame 21 in the left-right direction of the body frame 21. The right front wheel 32 is disposed on the right of the head pipe 211 and the link support 212 which define a portion of the body frame 21 in the left-right direction of the body frame 21. The left front wheel 31 and the right front wheel 32 are arranged side by side in the left-right direction of the body frame 21.

In the vehicle 1 according to the present preferred embodiment, the linkage 5 preferably uses a four parallel joint link system (also referred to as a parallelogram link).

The linkage 5 is disposed above the left front wheel 31 and the right front wheel 32 in the up-down direction of the body frame 21. The linkage 5 includes an upper cross member 51, a lower cross member 52, a left side member 53 and a right side member 54. The linkage 5 is not interlocked with the turning of the upstream steering shaft 62 about the rear intermediate steering axis SIB which occurs in association with the operation of the handlebar 61. Namely, the linkage 5 does not turn about the rear intermediate steering axis SIB relative to the body frame 21.

The link support 212 includes an upper intermediate connector 212a. An intermediate portion of the upper cross member 51 is supported on the link support 212 via the upper intermediate connector 212a. The upper cross member 51 is able to turn relative to the link support 212 about an upper intermediate connecting axis CUI that passes the upper intermediate connector 212a and extends in the front-rear direction of the body frame 21.

The upper intermediate connector 212a extends as far as the front of the upper cross member 51 and supports an upper portion of a headlamp unit as a portion of a headlamp support.

The link support 212 includes a lower intermediate connector 212b. An intermediate portion of the lower cross member 52 is supported on the link support 212 via the lower intermediate connector 212b. The lower cross member 52 is able to turn relative to the link support 212 about a lower intermediate connecting axis CDI that passes the lower intermediate connector 212b and extends in the front-rear direction of the body frame 21.

The lower intermediate connector 212b extends as far as the front of the lower cross member 52 and supports a lower portion of the headlamp unit as a portion of the headlamp support.

The left side member 53 includes an upper left connector 53a. A left end of the upper cross member 51 is connected to the left side member 53 via the upper left connector 53a. The upper cross member 51 is able to turn relative to the left side member 53 about an upper left connecting axis CUL that passes the upper left connecting 53a and which extends in the front-rear direction of the body frame 21.

The right side member 54 includes an upper right connector 54a. A right end of the upper cross member 51 is connected to the right side member 54 via the upper right connector 54a. The upper cross member 51 is able to turn relative to the right side member 54 about an upper right connecting axis CUR that passes the upper right connector 54a and which extends in the front-rear direction of the body frame 21.

The left side member 53 includes a lower left connector 53b. A left end of the lower cross member 52 is connected to the left side member 53 via the lower left connector 53b. The lower cross member 52 is able to turn relative to the left side member 53 about a lower left connecting axis CDL that passes the lower left connecting 53b and which extends in the front-rear direction of the body frame 21.

The right side member 54 includes a lower right connector 54b. A right end of the lower cross member 52 is connected to the right side member 54 via the lower right connector 54b. The lower cross member 52 is able to turn relative to the right side member 54 about a lower right connecting axis CDR that passes the lower right connector 54b and which extends in the front-rear direction of the body frame 21.

Figure 4:
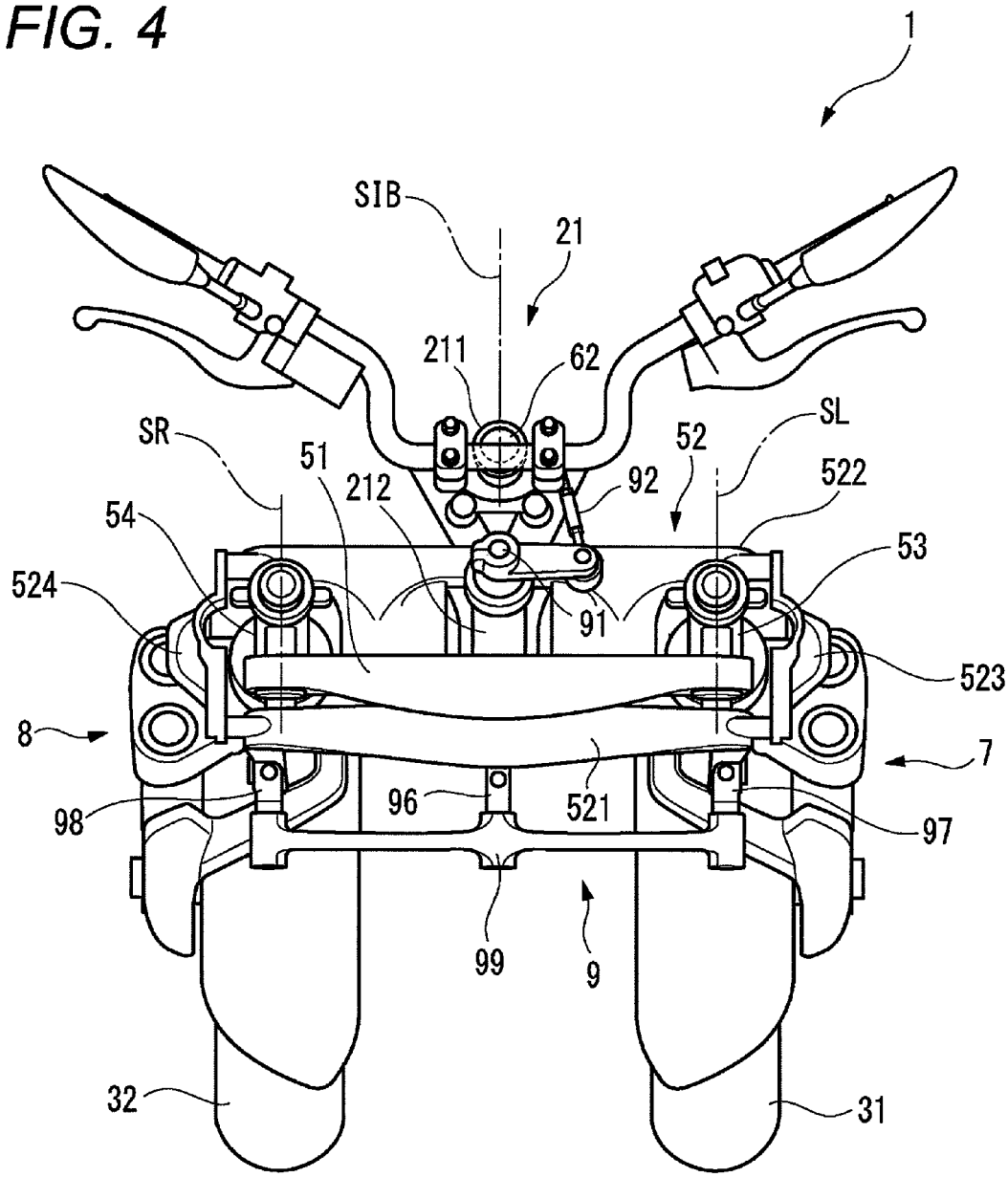
FIG. 4 is a plan view showing the front portion of the vehicle of FIG. 1.
Figure 4:
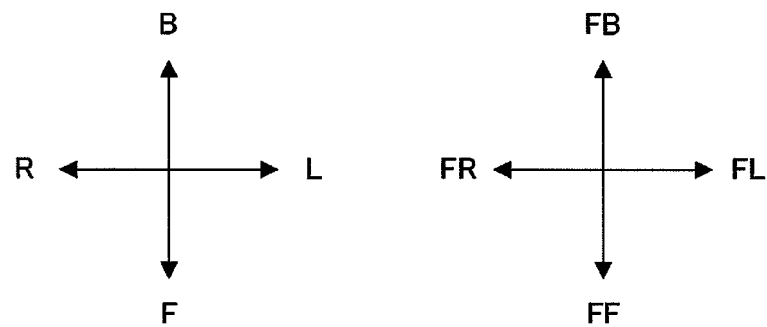

FIG. 4 is a plan view of the front portion of the vehicle 1 when viewed from the above in the up-down direction of the body frame 21. In FIG. 4, the body frame 21 is in the upright state. The following description to be made while referring to FIG. 4 is based on the premise that the body frame 21 is in the upright state. In FIG. 4, the front cover 221, the left side cover 224 and the right side cover 225 are omitted from illustration.

The upper cross member 51 is disposed ahead of the link support 212 in the front-rear direction of the body frame 21. The upper cross member 51 is a plate member that extends in the left-right direction of the body frame 21 without being curved in the front-rear direction of the body frame 21.

As shown in FIGS. 2 and 4, the lower cross member 52 is disposed below the upper cross member 51 in the up-down direction of the body frame 21. The lower cross member 52 includes a front element 521 and a rear element 522. The front element 521 is disposed ahead of the link support 212, the left side member 53 and the right side member 54 in the front-rear direction of the body frame 21. The rear element 522 is disposed behind the link support 212, the left side member 53 and the right side member 54 in the front-rear direction of the body frame 21. The front element 521 and the rear element 522 extend in the left-right direction of the body frame 21 without being curved in the front-rear direction of the body frame 21.

As shown in FIG. 4, the lower cross member 52 includes a left connector 523 and a right connector 524. The left connector 523 connects a left end of the front element 521 and a left end of the rear element 522 together. The right connector 524 connects a right end of the front element 521 and a right end of the rear element 522.

As shown in FIGS. 3 and 4, the left side member 53 is disposed directly on the left of the link support 212 in the left-right direction of the body frame 21. The left side member 53 is disposed above the left front wheel 31 in the up-down direction of the body frame 21. The left side member 53 extends in a direction in which the link support 212 extends. An upper portion of the left side member 53 is disposed behind a lower portion thereof in the front-rear direction of the body frame 21.

As shown in FIGS. 3 and 4, the right side member 54 is disposed directly on the right of the link support 212 in the left-right direction of the body frame 21. The right side member 54 is disposed above the right front wheel 32 in the up-down direction of the body frame 21. The right side member 54 extends in the direction in which the link support 212 extends. An upper portion of the right side member 54 is disposed behind a lower portion thereof in the front-rear direction of the body frame 21.

The upper cross member 51, the lower cross member 52, the left side member 53 and the right side member 54 are supported on the link support 212 so that the upper cross member 51 and the lower cross member 52 maintain postures that are parallel to each other and the left side member 53 and the right side member 54 maintain postures that are parallel to each other.

As shown in FIGS. 2 to 4, the vehicle 1 includes a left suspension 7. The left suspension 7 includes a left bracket 71 and a left shock absorber 72.

The left bracket 71 includes a left turning member, not shown, that is provided at an upper portion thereof. The left turning member is disposed in an interior of the left side member 53 and extends in the same orientation as the direction in which the left side member 53 extends. The left turning member is able to turn about a left steering axis SL relative to the left side member 53. Namely, the left bracket 71 is connected to the left side member 53 so as to turn about the left steering axis SL. The left steering axis SL extends in the direction in which the left side member 53 extends. As shown in FIG. 3, the left steering axis SL extends parallel to the rear intermediate steering axis SIB of the upstream steering shaft 62 in the up-down direction of the body frame 21. As shown in FIG. 4, the left steering axis SL extends parallel to the rear intermediate steering axis SIB of the upstream steering shaft 62 in the up-down direction of the body frame 21.

The left shock absorber 72 is preferably a so-called telescopic shock absorber. The left shock absorber 72 attenuates or absorbs a displacement of the left front wheel 31 towards the linkage 5 in the up-down direction of the body frame 21. As shown in FIG. 2, the left shock absorber 72 includes a left front telescopic element 721, a left rear telescopic element 722, a left upper connector 723, a left lower connector 714 and a left axle 725.

The left front telescopic element 721 includes a left front outer tube 721a and a left front inner tube 721b. An outer diameter of the left front outer tube 721a is greater than an outer diameter of the left front inner tube 721b. The left front outer tube 721a is supported by the left bracket 71. The left front inner tube 721b is connected to the left front outer tube 721a so as to slide along a left telescopic axis EL.

The left rear telescopic element 722 includes a left rear outer tube 722a and a left rear inner tube 722b. An outer diameter of the left rear outer tube 722a is greater than an outer diameter of the left rear inner tube 722b. The left rear outer tube 722a is disposed directly behind the left front outer tube 721a in the front-rear direction of the body frame 21. The left rear outer tube 722a is supported by the left bracket 71. The left rear inner tube 722b is disposed directly behind the left front inner tube 721b in the front-rear direction of the body frame 21. The left rear inner tube 722b is connected to the left rear outer tube 722a so as to be slidable within the left rear inner tube 722b along the left telescopic axis EL.

The left upper connector 723 connects the left front outer tube 721a and the left rear outer tube 722a together.

The left lower connector 724 connects the left front inner tube 721b and the left rear inner tube 722b together.

One end (a left end) of the left axle 725 is supported on the left front inner tube 721b and the left rear inner tube 722b via the left lower connector 724. The other end (a right end) of the left axle 725 supports the left front wheel 31.

The left shock absorber 72 attenuates or absorbs a displacement of the left front wheel 31 towards the linkage 5 in the up-down direction of the body frame 21. In particular, the left rear telescopic element 722 is provided with a well-known shock absorbing mechanism (not shown) to define a left shock absorber. The left front telescopic element 721, the left upper connector 723 and the left lower connector 724 define a left turn restrictor and restrict the relative turning between the left rear outer tube 722a and the left rear inner tube 722b.

As shown in FIGS. 2 to 4, the vehicle 1 includes a right suspension 8. The right suspension 8 includes a right bracket 81 and a right shock absorber 82. The configuration of the right shock absorber 8 is symmetrical with the left suspension 7 relative to the front-rear direction of the body frame 21. Thus, the right suspension 8 is not illustrated separately, and only reference numerals for the right suspension 8 will be shown in FIG. 2.

The right bracket 81 includes a right turning member, not shown, at an upper portion thereof. The right turning member is disposed in an interior of the right side member 54 and extends in the same orientation as the direction in which the right side member 54 extends. The right turning member is able to turn about a right steering axis SR relative to the right side member 54. Namely, the right bracket 81 is connected to the right side member 54 so as to turn about the right steering axis SR. The right steering axis SR extends in the direction in which the right side member 54 extends. As shown in FIG. 3, the right steering axis SR extends parallel to the rear intermediate steering axis SIB of the upstream steering shaft 62 in the up-down direction of the body frame 21. As shown in FIG. 4, the right steering axis SR extends parallel to the rear intermediate steering axis SIB of the upstream steering shaft 62 in the up-down direction of the body frame 21.

The right shock absorber 82 is preferably a so-called telescopic shock absorber. As shown in FIG. 2, the right shock absorber 82 includes a right front telescopic element 821, a right rear telescopic element 822, a right upper connector 823, a right lower connector 824 and a right axle 825.

The right front telescopic element 821 includes a right front outer tube 821a and a right front inner tube 821b. An outer diameter of the right front outer tube 821a is greater than an outer diameter of the right front inner tube 821b. The right front outer tube 821a is supported by the right bracket 81. The right front inner tube 821b is connected to the right front outer tube 821a so as to be slidable within the right front outer tube 821a along a right telescopic axis ER.

The right rear telescopic element 822 includes a right rear outer tube 822a and a right rear inner tube 822b. An outer diameter of the right rear outer tube 822a is greater than an outer diameter of the right rear inner tube 822b. The right rear outer tube 822a is disposed directly behind the right front outer tube 821a in the front-rear direction of the body frame 21. The right rear outer tube 822a is supported by the right bracket 81. The right rear inner tube 822b is disposed directly behind the right front inner tube 821b in the front-rear direction of the body frame 21. The right rear inner tube 822b is connected to the right rear outer tube 822a so as to slide along the right telescopic axis ER.

The right upper connector 823 connects the right front outer tube 821a and the right rear outer tube 822a together.

The right lower connector 824 connects the right front inner tube 821b and the right rear inner tube 822b together.

One end (a right end) of the right axle 825 is supported on the right front inner tube 821b and the right rear inner tube 822b via the right lower connector 824. The other end (a left end) of the right axle 825 supports the right front wheel 32.

The right shock absorber 82 attenuates or absorbs a displacement of the right front wheel 32 towards the linkage 5 in the up-down direction of the body frame 21. In particular, the right rear telescopic element 822 is provided with a well-known shock absorbing mechanism (not shown) to define a right shock absorber. The right front telescopic element 821, the right upper connector 823 and the right lower connector 824 define a right turn restrictor and restrict the relative turning between the right rear outer tube 822a and the right rear inner tube 822b.

As shown in FIGS. 2 to 4, the vehicle 1 includes a steering force transmission 9. The steering force transmission 9 includes a downstream steering shaft 91, a connecting device 92, an intermediate transmission plate 93, a left transmission plate 94, a right transmission plate 95, an intermediate joint 96, a left joint 97, a right joint 98 and a tie-rod 99.

The downstream steering shaft 91 is supported on the link support 212 so as to turn about a front intermediate steering axis SIF. The front intermediate steering axis SIF extends parallel to the rear intermediate steering axis SIB about which the upstream steering shaft 62 turns.

The connecting device 92 connects the upstream steering shaft 62 and the downstream steering shaft 91 together. The connecting device 92 is displaced in association with the turning of the upstream steering shaft 62. The downstream steering shaft 91 is able to turn in association with the displacement of the connecting device 92. Namely, the connecting device 92 transmits a turning operation of the upstream steering shaft 62 to the downstream steering shaft 91.

The intermediate transmission plate 93 is connected to a lower portion of the downstream steering shaft 91. The intermediate transmission plate 93 is not able to turn relative to the downstream steering shaft 91. The intermediate transmission plate 93 is able to turn about the front intermediate steering axis SIF relative to the link support 212.

The left transmission plate 94 is disposed directly on the left of the intermediate transmission plate 93 in the left-right direction of the body frame 21. The left transmission plate 94 is connected to a lower portion of the left bracket 71. The left transmission plate 94 is not able to turn relative to the left bracket 71. The left transmission plate 94 is able to turn about the left steering axis SL relative to the left side member 53.

The right transmission plate 95 is disposed directly on the right of the intermediate transmission plate 93 in the left-right direction of the body frame 21. The right transmission plate 95 is connected to a lower portion of the right bracket 81. The right transmission plate 95 is not able to turn relative to the right bracket 81. The right transmission plate 95 is able to turn about the right steering axis SR relative to the right side member 54.

As shown in FIG. 4, the intermediate joint 96 is connected to a front portion of the intermediate transmission plate 93 via a shaft that extends in the up-down direction of the body frame 21. The intermediate transmission plate 93 and the intermediate joint 96 are able to turn relative to each other about this shaft.

The left joint 97 is disposed on the left of the intermediate joint 96 in the left-right direction of the body frame 21. The left joint 97 is connected to a front portion of the left transmission plate 94 via a shaft that extends in the up-down direction of the body frame 21. The left transmission plate 94 and the left joint 97 are able to turn relative to each other about this shaft.

The right joint 98 is disposed on the right of the intermediate joint 96 in the left-right direction of the body frame 21. The right joint 98 is connected to a front portion of the right transmission plate 95 via a shaft that extends in the up-down direction of the body frame. The right transmission plate 95 and the right joint 98 are able to turn relative to each other about this shaft.

A shaft that extends in the front-rear direction of the body frame 21 is provided at a front portion of the intermediate joint 96. A shaft that extends in the front-rear direction of the body frame 21 is provided at a front portion of the left joint 97. A shaft that extends in the front-rear direction of the body frame 21 is provided at a front portion of the right joint 98.

The tie-rod 99 extends in the left-right direction of the body frame 21. The tie-rod 99 is connected to the intermediate joint 96, the left joint 97 and the right joint 98 via those shafts. The tie-rod 99 and the intermediate joint 96 are able to turn relative to each other about the shaft that is provided at the front portion of the intermediate joint 96. The tie-rod 99 and the left joint 97 are able to turn relative to each other about the shaft that is provided at the front portion of the left joint 97. The tie-rod 99 and the right joint 98 are able to turn relative to each other about the shaft that is provided at the front portion of the right joint 98.

The left transmission plate 94 is connected to the intermediate transmission plate 93 via the left joint 97, the tie-rod 99, and the intermediate joint 96. The right transmission plate 95 is connected to the intermediate transmission plate 93 via the right joint 98, the tie-rod 99 and the intermediate joint 96. The left transmission plate 94 and the right transmission plate 95 are connected to each other via the left joint 97, the tie-rod 99 and the right joint 98. In other words, the tie-rod 99 connects the intermediate transmission plate 93 to the left transmission plate 94 and the right transmission plate 95.

Figure 5:
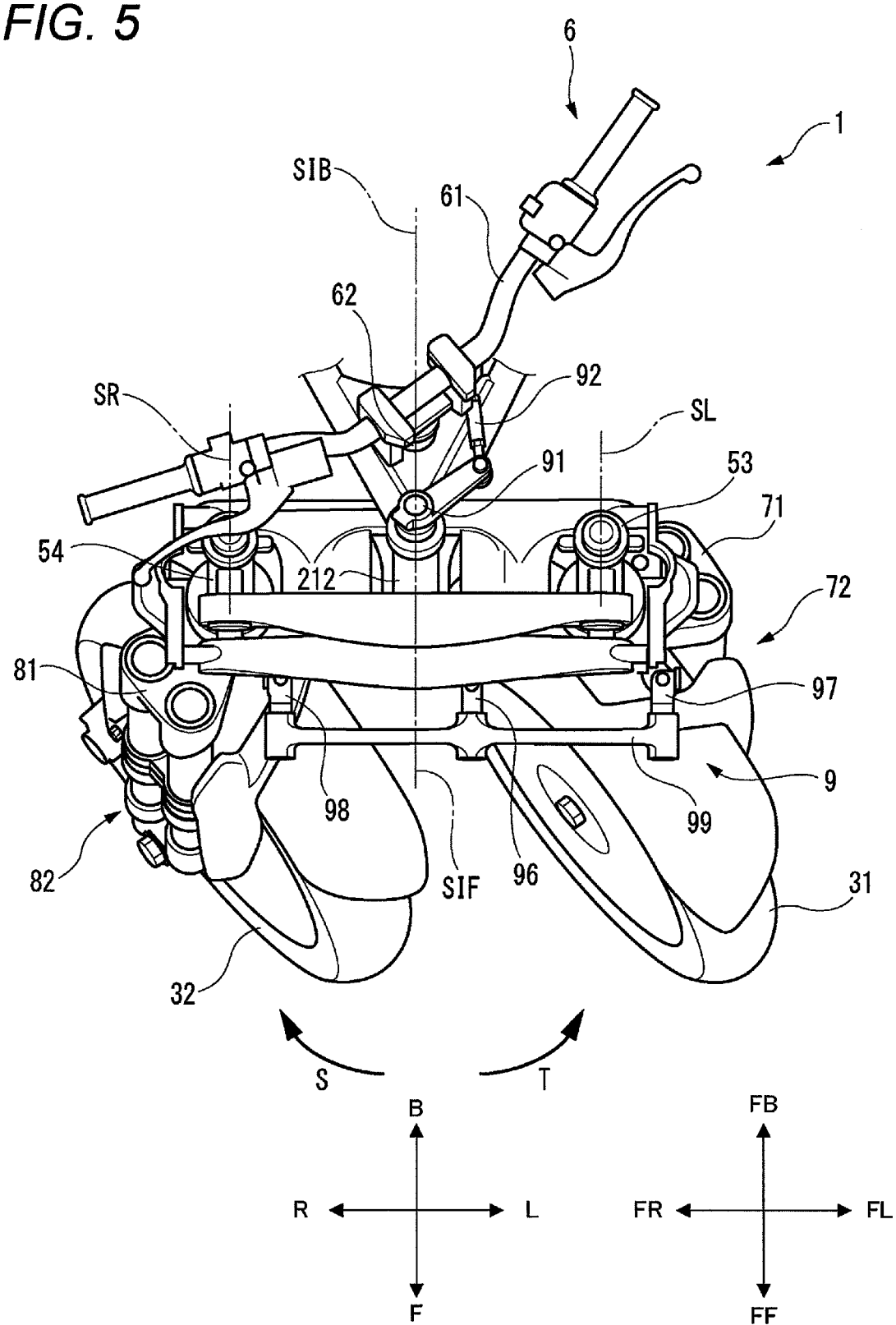
FIG. 5 is a plan view showing the front portion of the vehicle of FIG. 1 when steering is performed.

Next, referring to FIGS. 4 and 5, a steering operation of the vehicle 1 will be described. FIG. 5 is a plan view of the front portion of the vehicle 1 that is in such a state that the left front wheel 31 and the right front wheel 32 are turned to the left, as viewed from the above in the up-down direction of the body frame 21. In FIG. 5, the front cover 221, the left side cover 224 and the right side cover 225 are omitted from illustration.

When the rider operates the handlebar 61, the upstream steering shaft 62 is turned about the rear intermediate steering axis SIB relative to the head pipe 211. The turning operation of the upstream steering shaft 62 is transmitted to the downstream steering shaft 91 via the connecting device 92. When the turning of the upstream steering shaft 62 is so transmitted to the downstream steering shaft 91, the downstream steering shaft 91 is turned relative to the link support 212 about the front intermediate steering axis SIF. In the case of the downstream steering shaft 91 being turned to the left as shown in FIG. 5, the steering shaft 91 turns in a direction indicated by an arrow T. In association with the turning of the downstream steering shaft 91, the intermediate transmission plate 93 turns in the direction indicated by the arrow T about the front intermediate steering axis SIF relative to the link support 212.

In association with the turning of the intermediate transmission plate 93 in the direction indicated by the arrow T, the intermediate joint 96 turns relative to the intermediate transmission plate 93 in a direction indicated by an arrow S. This causes the tie-rod 99 to move to the left in the left-right direction of the body frame 21 and to the rear in the front-rear direction of the body frame 21 while maintaining its posture.

In association with the movement of the tie-rod 99, the left joint 97 and the right joint 98 turn in the direction indicated by the arrow S relative to the left transmission plate 94 and the right transmission plate 95, respectively. This turns the left transmission plate 94 and the right transmission plate 95 in the direction indicated by the arrow T while allowing the tie-rod 99 to maintain its posture.

When the left transmission plate 94 turns in the direction indicated by the arrow T, the left bracket 71, which is not able to turn relative to the left transmission plate 94, is turned in the direction indicated by the arrow T about the left steering axis SL relative to the left side member 53.

When the right transmission plate 95 turns in the direction indicated by the arrow T, the right bracket 81, which is not able to turn relative to the right transmission plate 95, is turned in the direction indicated by the arrow T about the right steering axis SR relative to the right side member 54.

When the left bracket 71 is turned in the direction indicated by the arrow T, the left shock absorber 72, which is supported on the left bracket 71, is turned in the direction indicated by the arrow T about the left steering axis SL relative to the left side member 53. When the left shock absorber 72 is turned in the direction indicated by the arrow T, the left front wheel 31, which is supported on the left shock absorber 72, is turned in the direction indicated by the arrow T about the left steering axis SL relative to the left side member 53.

When the right bracket 81 is turned in the direction indicated by the arrow T, the right shock absorber 82, which is supported on the right bracket 81, is turned in the direction indicated by the arrow T about the right steering axis SR relative to the right side member 54. When the right shock absorber 82 is turned in the direction indicated by the arrow T, the right front wheel 32, which is supported on the right shock absorber 82, is turned in the direction indicated by the arrow T about the right steering axis SR relative to the right side member 54.

When the rider operates the handlebar 61 so as to turn to the right, the elements described above turn in opposite directions to the directions in which they turn when the vehicle turns to the left. Since the elements merely move the other way around in relation to the left-right direction, detailed description thereof will be omitted here.

Thus, as has been described above, the steering member 6 transmits the steering force to the left front wheel 31 and the right front wheel 32 in response to the operation of the handlebar 61 by the rider. The left front wheel 31 and the right front wheel 32 turn about the left steering axis SL and the right steering axis SR, respectively, in the direction corresponding to the direction in which the handlebar 61 is operated by the rider.

Figure 6:
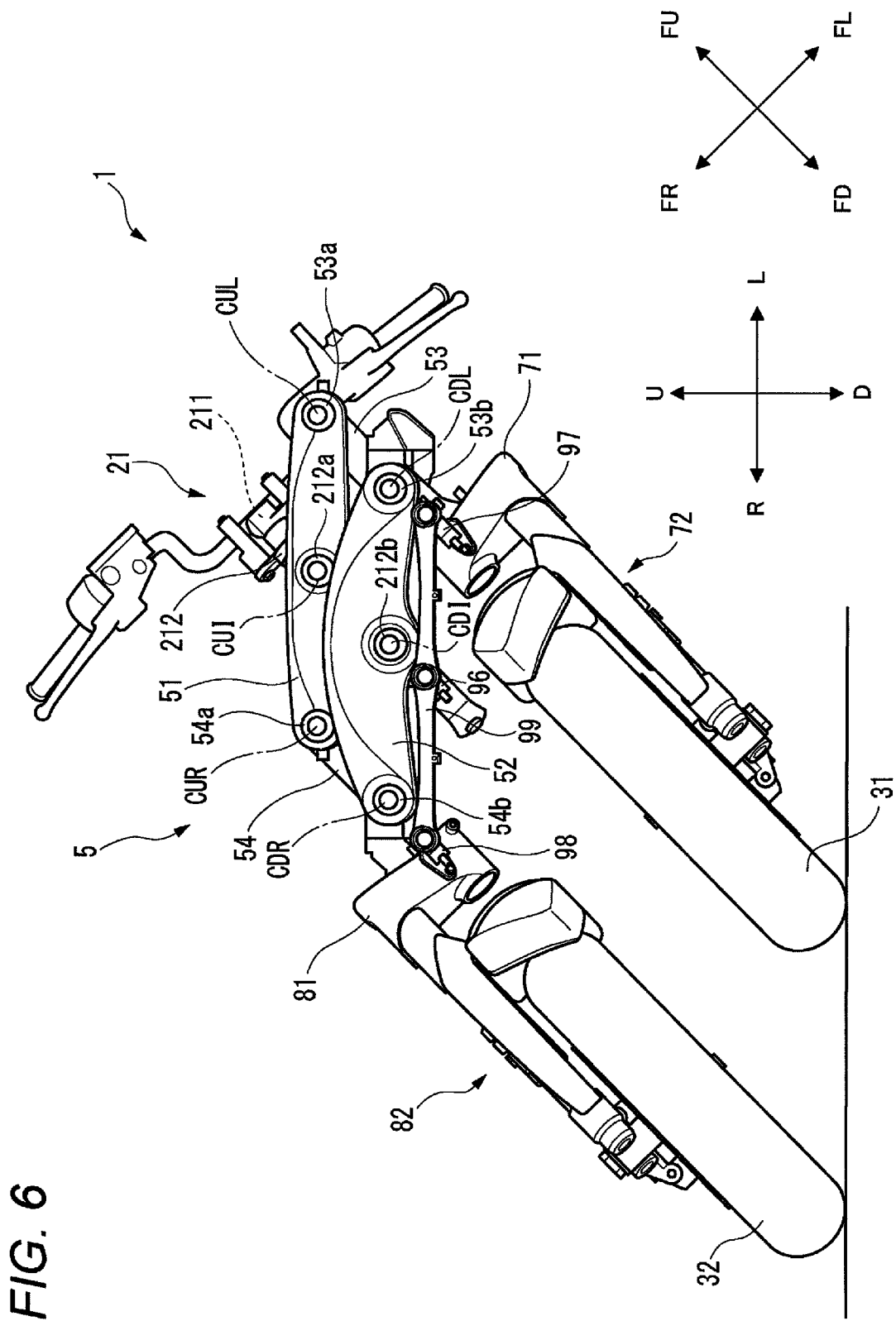
FIG. 6 is a front view showing the front portion of the vehicle of FIG. 1 when leaning is performed.

Next, referring to FIGS. 3 and 6, a leaning operation of the vehicle 1 will be described. FIG. 6 is a front view of the front portion of the vehicle 1, when viewed from the front in the front-rear direction of the body frame 21, with the body frame 21 caused to lean to the left of the vehicle 1. In FIG. 6, the front cover 221, the left side cover 224 and the right side cover 225 are omitted from illustration.

As shown in FIG. 3, when looking at the vehicle 1 from the front of the body frame 21 that is standing upright, the linkage 5 has a rectangular shape. As shown in FIG. 6, when looking at the vehicle 1 from the front of the body frame 21 that is leaning, the linkage 5 has a parallelogram shape. The operation of the linkage 5 is interlocked with the leaning of the body frame 21 in the left-right direction. The operation of the linkage 5 means that the shape of the linkage 5 changes as a result of the upper cross member 51 and the lower cross member 52 turning relative to the link support 212 about the upper intermediate connecting axis CUI and the lower intermediate connecting axis CDI, respectively, and the upper cross member 51, the lower cross member 52, the left side member 53 and the right side member 54 turning relatively about the upper left connecting axis CUL, the upper right connecting axis CUR, the lower left connecting axis CDL and the lower right connecting axis CDR, respectively.

For example, as shown in FIG. 6, when the rider causes the vehicle 1 to lean to the left, the head pipe 211 and the link support 212 lean to the left from the vertical direction. When the head pipe 211 and the link support 212 lean, the upper cross member 51 turns counterclockwise about the upper intermediate connecting axis CUI that passes the upper intermediate connector 212a relative to the link support 212 when viewed from the front of the vehicle 1. Similarly, the lower cross member 52 is turned counterclockwise about the lower intermediate connecting axis CDI that passes the lower intermediate connector 212b relative to the head pipe 211 when viewed from the front of the vehicle 1. This causes the upper cross member 51 to move to the left in the left-right direction of the body frame 21 relative to the lower cross member 52.

By moving in the way described above, the upper cross member 51 turns counterclockwise about the upper left connecting axis CUL that passes the upper left connector 53a and the upper right connecting axis CUR that passes the upper right connector 54a relative to the left side member 53 and the right side member 54, respectively when viewed from the front of the vehicle 1. Similarly, the lower cross member 52 turns counterclockwise about the lower left connecting axis CDL that passes the lower left connector 53b and the lower right connecting axis CDR that passes the lower right connector 54b relative to the left side member 53 and the right side member 54, respectively, when viewed from the front of the vehicle 1. By moving in the way described above, the left side member 53 and the right side member 54 lean to the left of the vehicle 1 from the vertical direction while maintaining postures that are parallel to the head pipe 211 and the link support 212.

As this occurs, the lower cross member 52 moves to the left in the left-right direction of the body frame 21 relative to the tie-rod 99. As a result of the lower cross member 52 moving in the way described above, the shafts that are provided at the respective front portions of the intermediate joint 96, the left joint 97 and the right joint 98 turn relative to the tie-rod 99. This allows the tie-rod 99 to hold a posture that is parallel to the upper cross member 51 and the lower cross member 52.

As the left side member 53 leans to the left of the vehicle 1, the left bracket 71 that is supported on the left side member 53 via the left turning member leans to the left of the vehicle 1. In association with the leftward leaning of the left bracket 71, the left shock absorber 72 that is supported on the left bracket 71 also leans to the left of the vehicle 1. As a result of the left shock absorber 72 leaning in the way described above, the left front wheel 31 that is supported on the left shock absorber 72 leans to the left of the vehicle 1 while maintaining its posture that is parallel to the head pipe 211 and the link support 212.

As the right side member 54 leans to the left of the vehicle 1, the right bracket 81 that is supported on the right side member 54 via the right turning member leans to the left of the vehicle 1. In association with the leftward leaning of the right bracket 81, the right shock absorber 82 that is supported on the right bracket 81 also leans to the left of the vehicle 1. As a result of the right shock absorber 82 leaning in the way described above, the right front wheel 32 that is supported on the right shock absorber 82 leans to the left of the vehicle 1 while maintaining its posture that is parallel to the head pipe 211 and the link support 212.

The description of the leaning operations of the left front wheel 31 and the right front wheel 32 is made based on the vertical direction. However, when the vehicle 1 leans (when the linkage 5 is operated), the up-down direction of the body frame 21 is not coincident with the vertical direction. In the event of this being described based on the up-down direction of the body frame 21, when the linkage 5 is operated, the left front wheel 31 and the right front wheel 32 change their relative positions in the up-down direction of the body frame 21. In other words, the linkage 5 changes the relative positions of the left front wheel 31 and the right front wheel 32 in the up-down direction of the body frame 21 to cause the body frame 21 to lean to the left or right of the vehicle 1 from the vertical direction.

When the rider causes the vehicle 1 to lean to the right, the elements lean to the right. Since the elements merely move the other way around in relation to the left-right direction, detailed description thereof will be omitted here.

Figure 7:
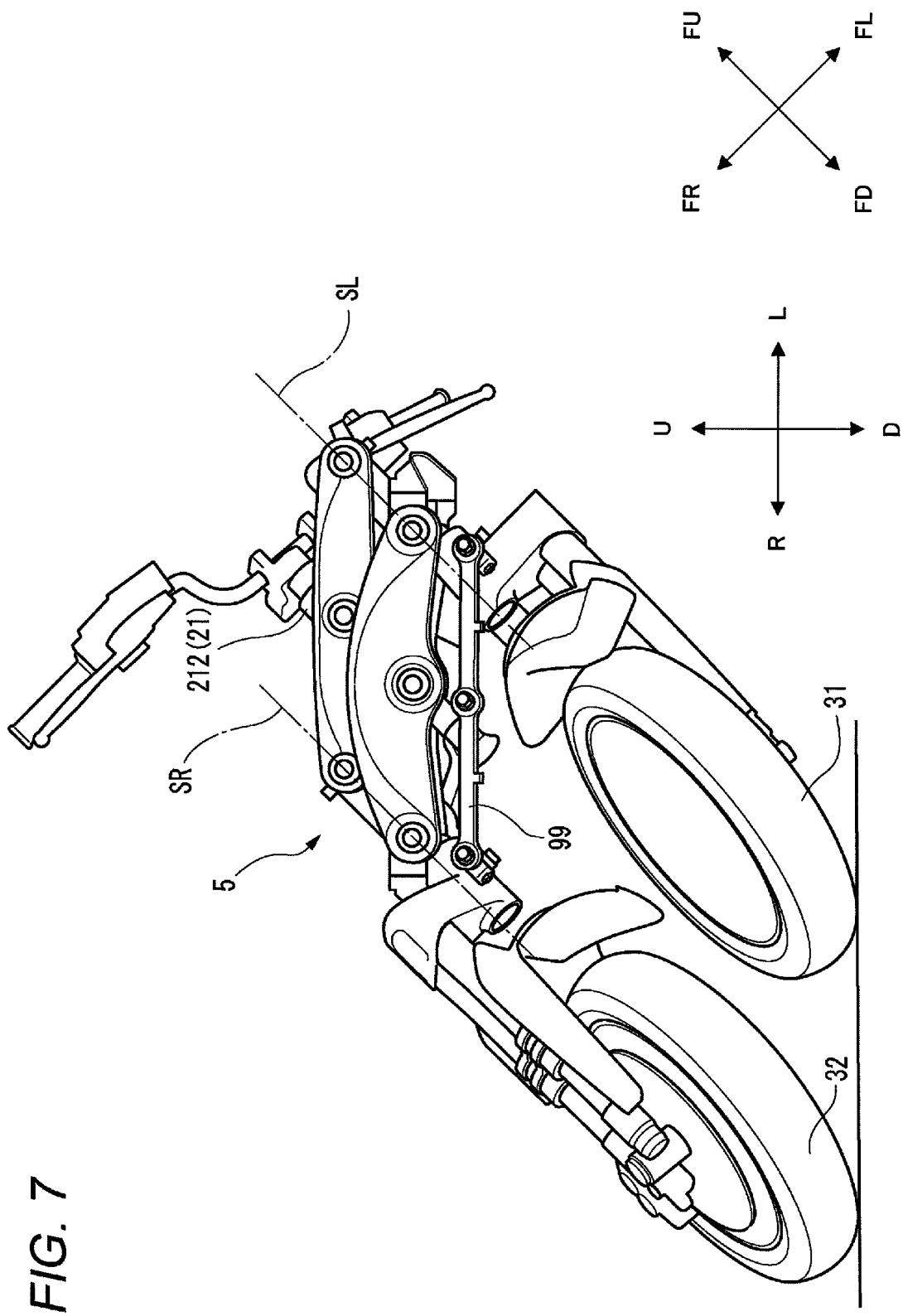
FIG. 7 is a front view showing the front portion of the vehicle of FIG. 1 when steering and leaning are performed.

FIG. 7 is a front view of the front portion of the vehicle 1, when viewed from the front in the front-rear direction of the body frame 21, in such a state that the vehicle 1 is caused to lean and turn. FIG. 7 shows a state in which the vehicle 1 is steered or turned to the left while being caused to lean to the left. In FIG. 7, the front cover 221, the left side cover 224 and the right side cover 225 are omitted from illustration.

When a steering operation is performed, the left front wheel 31 is turned counterclockwise about the left steering axis SL, while the right front wheel 32 is turned counterclockwise about the right steering axis SR. When a leaning operation is performed, the left front wheel 31 and the right front wheel 32 lean to the left of the vehicle 1 together with the body frame 21. Namely, in this state, the linkage 5 has the parallelogram shape. The tie-rod 99 moves to the left in the left-right direction of the body frame 21 and to the rear in the front-rear direction of the body frame 21 from the position where the body frame 21 is in the upright state.

Next, referring to FIGS. 8 to 11, the configurations of the left side cover 224 (an example of a first left cover) and the right side cover 225 (an example of a first right cover) will be described in detail.

Figure 8:
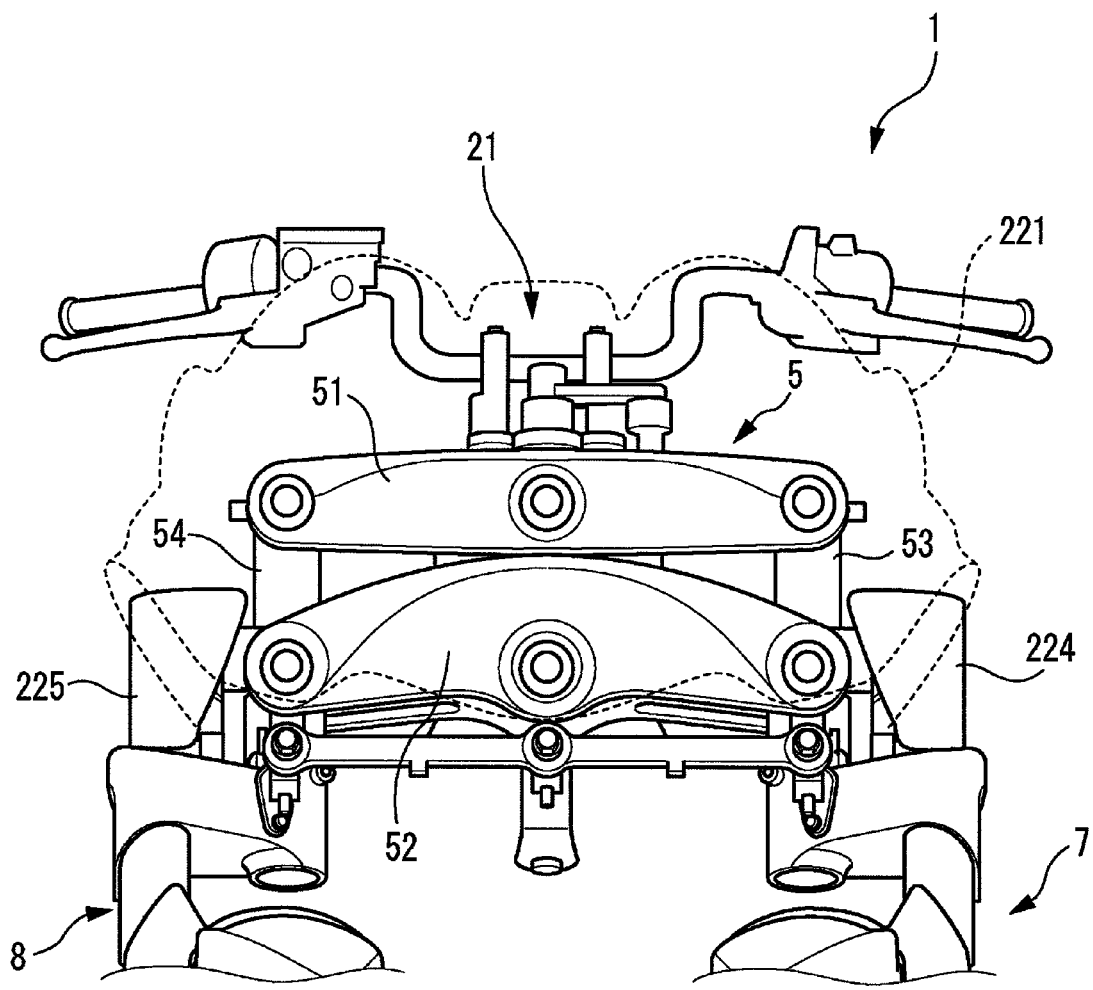
FIG. 8 is a front view showing the front portion of the vehicle of FIG. 1 with a front cover, a left side cover and a right side cover.
Figure 8:
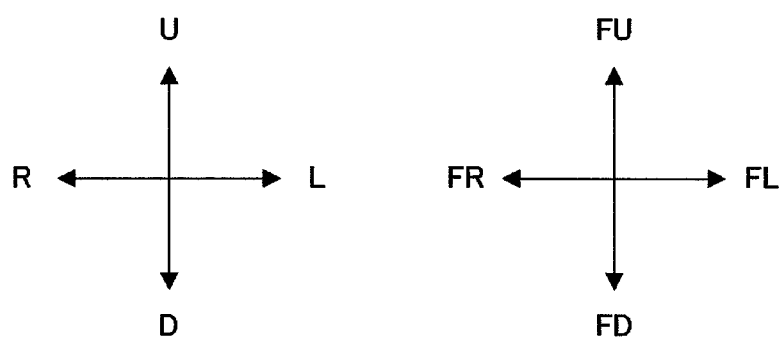

FIG. 8 is a front view of the front portion of the vehicle 1 viewed from the front in the front-rear direction of the body frame 21. In FIG. 8, the body frame 21 is in the upright state. The following description to be made while referring to FIG. 8 is based on the premise that the body frame 21 is in the upright state. FIG. 8 shows a state as seen through the front cover 221 that is indicated by dashed lines.

Figure 9:
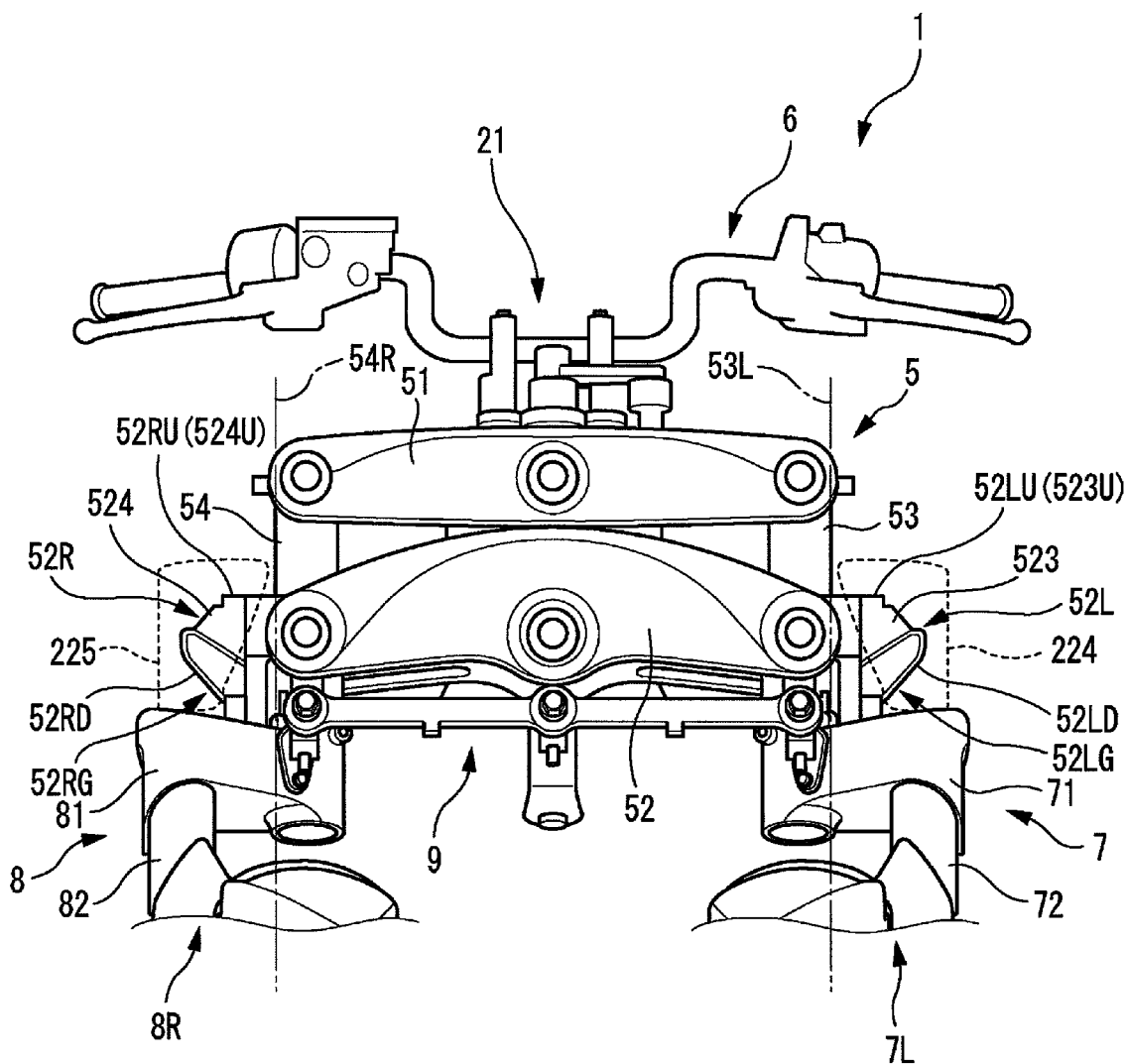
FIG. 9 is a front view showing the front portion of the vehicle of FIG. 1 with the left side cover and the right side cover.
Figure 9:
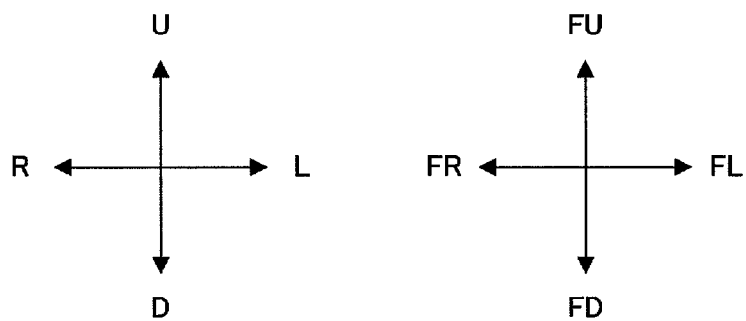

FIG. 9 is a front view of the front portion of the vehicle 1 viewed from the front in the front-rear direction of the body frame 21. In FIG. 9, the body frame 21 is in the upright state. The following description to be made while referring to FIG. 9 is based on the premise that the body frame 21 is in the upright state. In FIG. 9, the front cover 221 is omitted from illustration. FIG. 9 shows a state as seen through the left side cover 224 and the right front cover 225 that are indicated by dashed lines.

Figure 10:
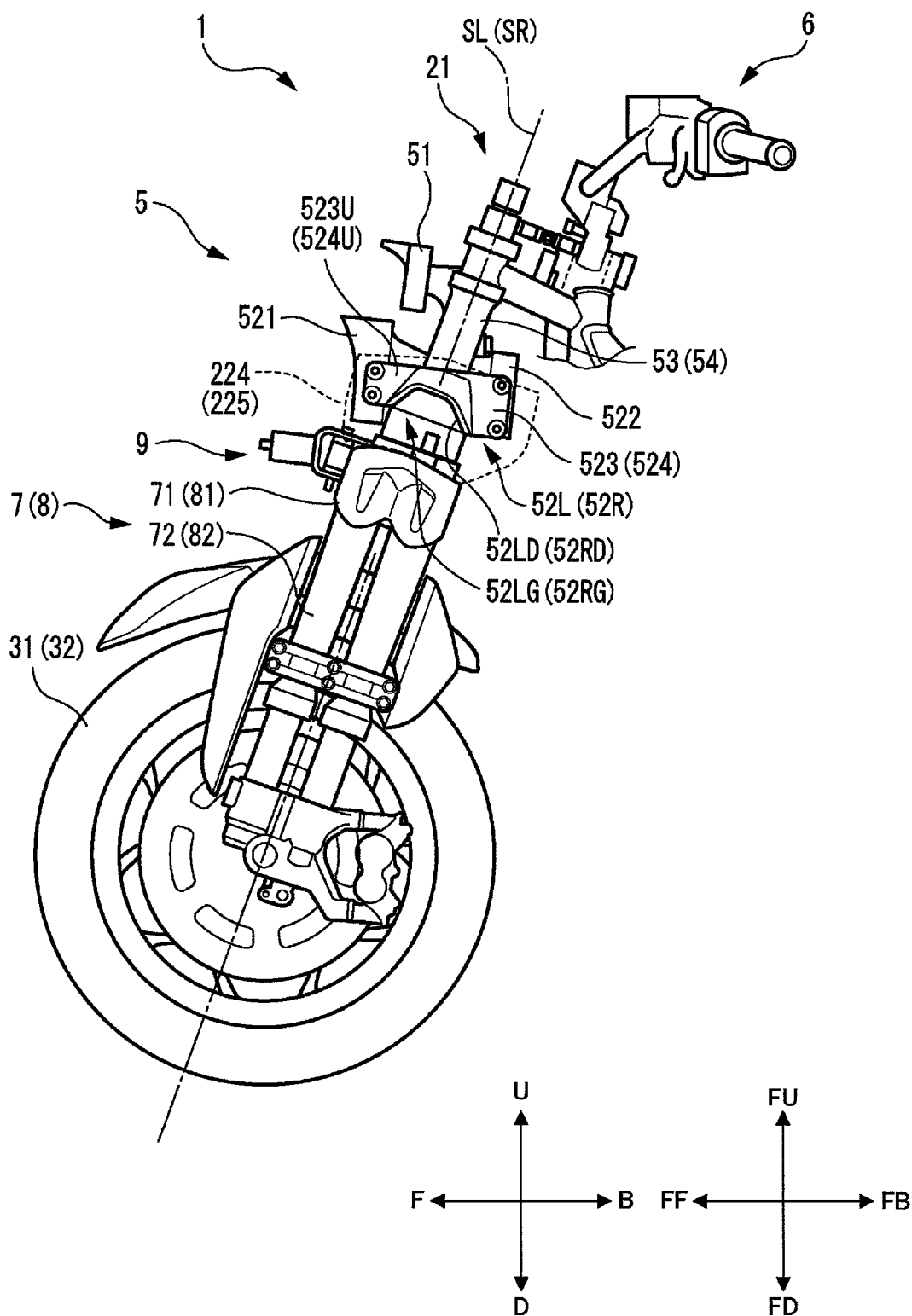
FIG. 10 is a left side view showing the front portion of the vehicle of FIG. 1 with the left side cover.

FIG. 10 is a side view of the front portion of the vehicle 1 viewed from the left in the left-right direction of the body frame 21. In FIG. 10, the body frame 21 is in the upright state. The following description to be made while referring FIG. 10 is based on the premise that the body frame 21 is in the upright state. In FIG. 10, the front cover 221 is omitted from illustration. FIG. 10 shows a state as seen through the left side cover 224 that is indicated by dashed lines. A configuration of the front portion of the vehicle 1 viewed from the right in the left-right direction of the body frame 21 is symmetrical with the configuration shown in FIG. 10 in relation to the front-rear direction. Thus, individual illustration of the front portion of the vehicle 1 as seen through the right side cover 225 is omitted, and only reference numerals related thereto will be shown in FIG. 10.

Figure 11:
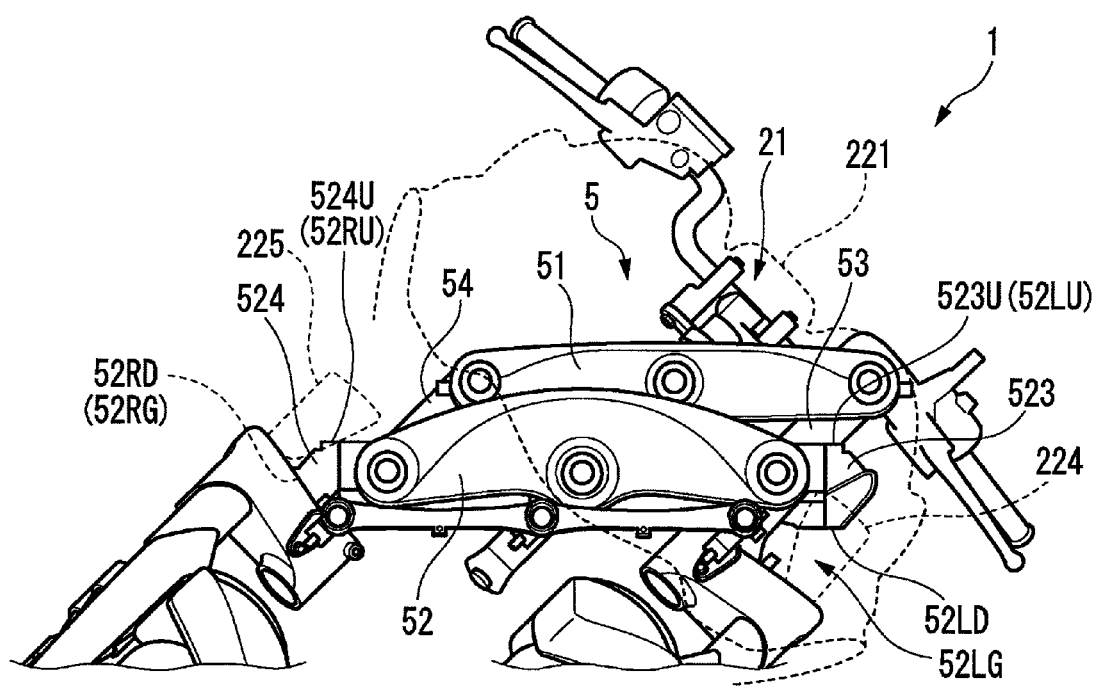
FIG. 11 is a front view showing the front portion of the vehicle of FIG. 1 that is caused to lean, with the front cover, the left side cover and the right side cover.
Figure 11:
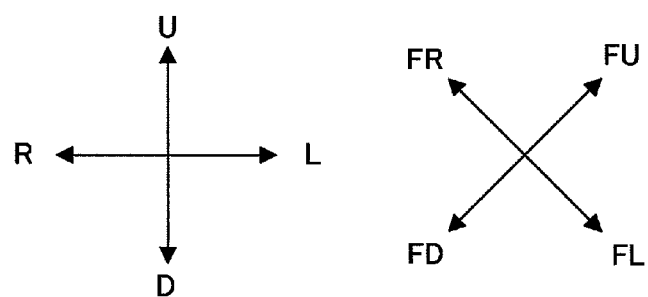

FIG. 11 is a front view of the front portion of the vehicle 1 viewed from the front in the front-rear direction of the body frame 21 that is caused to lean to the left at a maximum angle. FIG. 11 shows a state as seen through the front cover 221 that is indicated by dashed lines.

As shown in FIG. 8, the left side cover 224 is attached to the left suspension 7. The right side cover 225 is attached to the right suspension 8.

As shown in FIG. 9, the lower cross member 52 includes a left lower projection 52L that is disposed on the left of a left end 53L of the left side member 53. The left lower projection 52L includes a left connector 523.

On the other hand, the lower cross member 52 includes a right lower projection 52R that is disposed on the right of a right end 54R of the right side member 54. The right lower projection 52R includes a right connector 524.

As shown in FIGS. 9 and 10, the left side cover 224 covers a lower edge 52LD of the left lower projection 52L from the left in the left-right direction of the body frame 21, as viewed from the left in the left-right direction of the body frame 21 that is in the upright state. The lower edge 52LD includes a lower edge of the left connector 523.

On the other hand, the right side cover 225 covers a lower edge 52RD of the right lower projection 52R from the right in the left-right direction of the body frame 21, as viewed from the right in the left-right direction of the body frame 21 that is in the upright state. The lower edge 52RD includes a lower edge of the right connector 524.

As the body frame 21 shifts from the upright state shown in FIG. 10 to a state shown in FIG. 11 in which the body frame 21 is caused to lean to the left at a maximum angle, the lower edge 52LD of the left lower projection 52L is displaced upwards along the left steering axis SL on the left of the left side member 53 when viewed from the left in the left-right direction of the body frame 21. On the other hand, the lower edge 52RD of the right lower projection 52R is displaced downwards along the right steering axis SR on the right of the right side member 54 when viewed from the right in the left-right direction of the body frame 21.

Although not shown since the configurations are symmetrical relative to the left-right direction, as the body frame 21 shifts from the upright state shown in FIG. 10 to a state in which the body frame 21 is caused to lean to the right at a maximum angle, the lower edge 52LD of the left lower projection 52L is displaced downwards along the left steering axis SL on the left of the left side member 53 when viewed from the left in the left-right direction of the body frame 21. On the other hand, the lower edge 52RD of the right lower projection 52R is displaced upwards along the right steering axis SR on the right of the right side member 54 when viewed from the right in the left-right direction of the body frame 21.

Consequently, as is clear from FIGS. 10 and 11, the right side cover 225 covers the lower edge 52RD of the right lower projection 52R from the right in the left-right direction of the body frame 21, as viewed from the right in the left-right direction of the body frame 21 that is caused to lean to the left at the maximum angle.

Although not shown since the configurations are symmetrical relative to the left-right direction, the left side cover 224 covers the lower edge 52L of the left lower projection 52L from the left in the left-right direction of the body frame 21, as viewed from the left in the left-right direction of the body frame 21 that is caused to lean to the right at the maximum angle.

According to this configuration, as the linkage 5 operates, the left side cover 224 is displaced together with the left suspension 7 relative to the body frame 21, and the right side cover 225 is displaced together with the right suspension 8 relative to the body frame 21. In other words, the relative position of the left side cover 224 to the left suspension 7 and the relative position of the right side cover 225 to the right suspension 8 do not change substantially even though the linkage 5 operates. Consequently, the left side cover 224 and the right side cover 225 do not have to cover the entire moving area of the portion that needs to be protected from foreign matter such as stones that come flying from the side and hence should have a required minimum area. In addition, since the relative positions do not change substantially even though the linkage 5 operates, there is no need to consider the interference of the left side cover 224 with the left suspension 7 and the interference of the right side cover 225 with the right suspension 8. Consequently, the left side cover 224 and the right side cover 225 are easily disposed closely to the portion required to be protected. As a result, it is possible to prevent the enlargement in size of the front portion of the vehicle 1 while enabling the prevention or reduction of intrusion of foreign matter into the linkage 5.

As shown in FIG. 9, the left suspension 7 includes a left outer portion 7L that extends farther leftwards than the left end 53L of the left side member 53 in the left-right direction of the body frame 21. The left outer portion 7L includes a portion of the left bracket 71 and a left shock absorber 72.

On the other hand, the right suspension 8 includes a right outer portion 8R that extends farther rightwards than the right end 54L of the right side member 54 in the left-right direction of the body frame 21. The right outer portion 8R includes a portion of the right bracket 81 and a right shock absorber 82.

As shown in FIGS. 9 and 10, the left side cover 224 covers a gap 52LG defined between the left lower projection 52L and the left outer portion 7L (an example of an area defined by the lower edge of the left lower projection and an upper edge of the left outer portion) from the left in the left-right direction of the body frame 21, as viewed from the left in the left-right direction of the body frame 21 that is in the upright state.

On the other hand, the right side cover 225 covers a gap 52RG defined between the right lower projection 52R and the right outer portion 8R (an example of an area defined by the lower edge of the right lower projection and an upper edge of the right outer portion) from the right in the left-right direction of the body frame 21, as viewed from the right in the left-right direction of the body frame 21 that is in the upright state.

As the body frame 21 shifts from the upright state shown in FIG. 10 to the state shown in FIG. 11 in which the body frame 21 is caused to lean to the left at the maximum angle, the gap 52LG between the left lower projection 52L and the left outer portion 7L becomes wider. On the other hand, the gap 52RG between the right lower projection 52R and the right outer portion 8R becomes narrower.

Although not shown since the configurations are symmetrical relative to the left-right direction, as the body frame 21 shifts from the upright state shown in FIG. 10 to the state in which the body frame 21 is caused to lean to the right at the maximum angle, the gap 52LG between the left lower projection 52L and the left outer portion 7L becomes narrower. On the other hand, the gap 52RG between the right lower projection 52R and the right outer portion 8R becomes wider.

Consequently, as is clear from FIGS. 10 and 11, the right side cover 225 covers the gap 52RG from the right in the left-right direction of the body frame 21, as viewed from the right in the left-right direction of the body frame 21 that is caused to lean to the left at the maximum angle.

Although not shown since the configurations are symmetrical relative to the left-right direction, the left side cover 224 covers the gap 52LG from the left in the left-right direction of the body frame 21, as viewed from the left in the left-right direction of the body frame 21 that is caused to lean to the right at the maximum angle.

In the case of the left suspension 7 including the left outer portion 7L, when the body frame 21 leans to the right from the upright state, there is a possibility that foreign matter intrudes into a space between the left outer portion 7L and the left side member 53. According to the configuration described above, the intrusion of the foreign matter into the portion concerned is prevented or significantly reduced by the left side cover 224.

Likewise, in the case of the right suspension 8 including the right outer portion 8R, when the body frame 21 leans to the left from the upright state, there is a possibility that foreign matter intrudes into a space between the right outer portion 8R and the right side member 54. According to the configuration described above, the intrusion of the foreign matter into the portion concerned is prevented or significantly reduced by the right side cover 225.

As a result, it is possible to further prevent the enlargement in size of the front portion of the vehicle 1 while enabling the prevention or reduction of intrusion of foreign matter into the linkage 5.

As shown in FIG. 9, the left side cover 224 is attached to the left outer portion 7L of the left suspension 7. The right side cover 225 is attached to the right outer portion 8R of the right suspension 8.

By disposing the left side cover 224 in the way described above, it is easy to prevent or significantly reduce the intrusion of foreign matter in a position that is located to the left from the linkage 5. Likewise, by disposing the right side cover 225 in the way described above, it is easy to prevent or significantly reduce the intrusion of foreign matter in a position that is located to the right from the linkage 5. Consequently, it is possible to prevent the enlargement in size of the front portion of the vehicle 1 while preventing or reducing the intrusion of foreign matter into the linkage 5 more efficiently.

More specifically, the left suspension 7 includes the left bracket 71 (an example of a left upper portion) and the left shock absorber 72 (an example of a left lower portion). The left bracket 71 is connected to the left side member 53 so as to be able to turn relative to the left side member 53. The left bracket 71 is thus supported on the left side member 53. The left shock absorber 72 supports the left front wheel 31 and is able to be displaced in the up-down direction relative to the left bracket 71. The left suspension 7 is turned about the left steering axis SL in a turning direction of the steering member 6 via the steering force transmission 9. As shown in FIG. 9, the left side cover 224 is attached to the left bracket 71.

On the other hand, the right suspension 8 includes the right bracket 81 (an example of a right upper portion) and the right shock absorber 82 (an example of a light lower portion). The right bracket 81 is connected to the right side member 54 so as to be able to turn relative to the right side member 54. The right bracket 81 is thus supported on the right side member 54. The right shock absorber 82 supports the right front wheel 32 and is able to be displaced in the up-down direction relative to the right bracket 81. The right suspension 8 is turned about the right steering axis SR in the turning direction of the steering member 6 via the steering force transmission 9. As shown in FIG. 9, the right side cover 225 is attached to the right bracket 81.

According to this configuration, the left side cover 224 and the right side cover 225 follow the turning of the left suspension 7 and the right suspension 8 as a result of the operation of the steering member 6 in addition to the operation of the linkage 5. Relative postures of the left side member 53 and the left suspension 7 changes in accordance with the turning. Thus, foreign matter might intrude into a space between the left side member 53 and the left suspension 7 as well. Similarly, relative postures of the right side member 54 and the right suspension 8 in accordance with the turning operation. Thus, foreign matter might intrude into a space between the right side member 54 and the right suspension 8 as well. According to the configuration described above, the left side cover 224 and the right side cover 225 that are displaced together with the left side member 53 and the right side member 54, respectively, also protect the portions concerned. Consequently, it is possible to prevent the enlargement in size of the front portion of the vehicle 1 while the intrusion of foreign matter into the linkage 5 is further prevented or significantly reduced.

As shown in FIG. 10, the lower cross member 52 includes a front element 521 and a rear element 522. The front element 521 is disposed directly ahead of the rear element 522 in a direction that follows the lower intermediate connecting axis CDI (refer to FIG. 3) of the lower intermediate connector 212b. The rear element 522 is disposed directly behind the front element 521 in the direction that follows the lower intermediate connecting axis CDI (refer to FIG. 3) of the lower intermediate connector 212b. The front element 521 and the rear element 522 are connected together by a left connector 523 (an example of a left connector) and a right connector 524 (an example of a right connector).

As described above, the left lower projection 52L of the lower cross member 52 includes the left connector 523, and the lower edge 52LD of the left lower projection 52L includes a lower edge of the left connector 523. As shown in FIGS. 9 and 10, the left side cover 224 covers a portion where the lower edge of the left connector 523 and the left side member 53 overlap from at least the left in the left-right direction of the body frame 21, as viewed from the left in the left-right direction of the body frame 21.

Providing the left connector 523 improves the rigidity of the connector between the lower cross member 52 and the left side member 53. On the other hand, when the body frame 21 is caused to lean to the right from the upright state, there is the possibility that foreign matter intrudes into a space between the lower edge of the left connector 523 and the left side member 53. According to the configuration described above, the intrusion of the foreign matter into the portion concerned is prevented or significantly reduced by the left side cover 224.

On the other hand, the right lower projection 52R of the lower cross member 52 includes the right connector 524, and the lower edge 52RD of the right lower projection 52R includes a lower edge of the right connector 524. As shown in FIGS. 9 and 10, the right side cover 225 covers a portion where the lower edge of the right connector 524 and the right side member 54 overlap from at least the right in the left-right direction of the body frame 21, as viewed from the right in the left-right direction of the body frame 21.

Providing the right connector 524 improves the rigidity of the connector between the lower cross member 52 and the right side member 54. On the other hand, when the body frame 21 is caused to lean to the left from the upright state, there is the possibility that foreign matter intrudes into a space between the lower edge of the right connector 524 and the right side member 54. According to the configuration described above, the intrusion of the foreign matter into the portion concerned is prevented or significantly reduced by the right side cover 225.

As a result, it is possible to prevent the enlargement in size of the front portion of the vehicle 1 while preventing or reducing the intrusion of foreign matter into the linkage 5 whose rigidity is enhanced.

As the body frame 21 shifts from the upright state shown in FIG. 10 to the state shown in FIG. 11 in which the body frame 21 is caused to lean to the left at the maximum angle, the lower edge of the left connector 523 is displaced upwards along the left steering axis SL on the left of the left side member 53 when viewed from the left in the left-right direction of the body frame 21. On the other hand, the lower edge of the right connector 524 is displaced downwards along the right steering axis SR on the right of the right side member 54 when viewed from the right in the left-right direction of the body frame 21.

Although not shown since the configurations are symmetrical relative to the left-right direction, as the body frame 21 shifts from the upright state shown in FIG. 10 to a state in which the body frame 21 is caused to lean to the right at the maximum angle, the lower edge of the left connector 523 is displaced downwards along the left steering axis SL on the left of the left side member 53 when viewed from the left in the left-right direction of the body frame 21. On the other hand, the lower edge of the right connector 524 is displaced upwards along the right steering axis SR on the right of the right side member 54 when viewed from the right in the left-right direction of the body frame 21.

Consequently, as is clear from FIGS. 10 and 11, the right side cover 225 covers the lower edge of the right connector 524 from the right in the left-right direction of the body frame 21, as viewed from the right in the left-right direction of the body frame 21 that is caused to lean to the left at the maximum angle.

On the other hand, although not shown since the configurations are symmetrical relative to the left-right direction with each other, the left side cover 224 covers the lower edge of the left connector 523 from the left in the left-right direction of the body frame 21, as viewed from the left in the left-right direction of the body frame 21 that is caused to lean to the right at the maximum angle.

According to this configuration, by using the left side cover 224 and the right side cover 225 that have the required minimum area, it is possible to prevent or significantly reduce the intrusion of foreign matter into the linkage 5 even though the incoming direction of the foreign matter changes in accordance with the leaning angle of the body frame 21. Consequently, it is possible to further prevent the enlargement in size of the front portion of the vehicle 1 while preventing or reducing the intrusion of foreign matter into the linkage 5 whose rigidity is enhanced.

As the body frame 21 shifts from the upright state shown in FIG. 10 to the state shown in FIG. 11 in which the body frame 21 is caused to lean to the left at the maximum angle, an upper edge 523U of the left connector 523 is displaced upwards along the left steering axis SL on the left of the left side member 53 when viewed from the left in the left-right direction of the body frame 21.

As is clear from FIGS. 1, 10 and 11, the front cover 221 (an example of a second left cover) covers the upper edge 523U of the left connector 523 from at least the left in the left-right direction of the body frame 21, as viewed from the left in the left-right direction of the body frame 21 that is caused to lean to the left at the maximum angle.

Providing the left connector 523 may result in the possibility that foreign matter intrudes into the linkage 5 also from a portion located between the upper edge 523U of the left connector 523 and the left side member 53 when the body frame 21 leans from the upright state to the left. According to the configuration described above, the intrusion of the foreign matter into the portion concerned is prevented or significantly reduced by the front cover 221.

Although not shown since the configuration is symmetrical relative to the left-right direction, as the body frame 21 shifts from the upright state shown to a state in which the body frame 21 is caused to lean to the right at the maximum angle, an upper edge 524U of the right connector 524 is displaced upwards along the right steering axis SR on the right of the right side member 54 when viewed from the right in the left-right direction of the body frame 21.

In such a state that the body frame 21 is caused to lean to the right at the maximum angle, the front cover 221 (an example of a second right cover) covers the upper edge 524U of the right connector 524 from at least the right in the left-right direction of the body frame 21, as viewed from the right in the left-right direction of the body frame 21.

Providing the right connector 524 may result in the possibility that foreign matter intrudes into the linkage 5 also from a portion located between the upper edge 524U of the right connector 524 and the right side member 54 when the body frame 21 leans from the upright state to the right. According to the configuration described above, the intrusion of the foreign matter into the portion concerned is prevented or significantly reduced by the front cover 221.

As a result, it is possible to prevent the enlargement in size of the front portion of the vehicle 1 while preventing or further reducing the intrusion of foreign matter into the linkage 5 whose rigidity is enhanced.

As shown in FIG. 11, the left side cover 224 is disposed inside the front cover 221 in such a state that the body frame 21 is caused to lean to the left at the maximum angle.

On the other hand, although not shown since the configurations are symmetrical relative to the left-right direction, the right side cover 225 is disposed inside the front cover 221 in such a state that the body frame 21 is caused to lean to the right at the maximum angle.

According to this configuration, since one function of the front cover 221 to prevent or significantly reduce the intrusion of foreign matter into the linkage 5 is assigned to the left side cover 224 and the right side cover 225, the front cover 221 itself is small in size. In addition, when the body frame 21 leans from the upright state, the left side member 53, the left suspension 7, the right side member 54 and the right suspension 8 are displaced farther inwards in the left-right direction of the body frame 21 than positions they take when the body frame 21 is in the upright state. This displaces the left side cover 224 and the right side cover 225 farther inwards in the left-right direction of the body frame 21 than positions they take when the body frame 21 is in the upright state. Consequently, the necessity is reduced of ensuring a larger space within the front cover 221 so as to avoid the interference with the left side cover 224 and the right side cover 225. This fact also contributes to the reduction in size of the front cover 221. As a result, it is possible to further prevent the enlargement in size of the front portion of the vehicle while preventing or further reducing the intrusion of foreign matter into the linkage 5.

In the present preferred embodiment, the upper edge 523U of the left connector 523 is included in the upper edge 52LU of the left lower projection 52L of the lower cross member 52. Consequently, as is clear from FIGS. 9 to 11, in such a state that the body frame 21 is caused to lean to the left at the maximum angle, the upper edge 52LU of the left lower projection 52L is covered by the front cover 221, as viewed from the left in the left-right direction of the body frame 21.

According to this configuration, at least in such a state that the body frame 21 leans to the left at the maximum leaning angle, the function to prevent or significantly reduce the intrusion of foreign matter into the portion between the upper edge 52LU of the left lower projection 52L and the left side member 53 is assigned from the left side cover 224 to the front cover 221. In other words, the left side cover 224 does not have to have such a size that it continues to cover the upper edge 52LU of the left lower projection 52L until the body frame 21 is caused to lean to the left at the maximum angle. Consequently, it is possible to prevent the enlargement in size of the left side cover 224.

On the other hand, the upper edge 524U of the right connector 524 is included in the upper edge 52RU of the right lower projection 52R of the lower cross member 52. Consequently, as is clear from FIGS. 9 to 11, in such a state that the body frame 21 is caused to lean to the right at the maximum angle, the upper edge 52RU of the right lower projection 52R is covered by the front cover 221, as viewed from the right in the left-right direction of the body frame 21.

According to this configuration, at least in such a state that the body frame 21 leans to the right at the maximum leaning angle, the function to prevent or significantly reduce the intrusion of foreign matter into the portion between the upper edge 52RU of the right lower projection 52R and the right side member 54 is assigned from the right side cover 225 to the front cover 221. In other words, the right side cover 225 does not have to have such a size that it continues to cover the upper edge 52RU of the right lower projection 52R until the body frame 21 is caused to lean to the right at the maximum angle. Consequently, it is possible to prevent the enlargement in size of the right side cover 225.

As a result, it is possible to further prevent the enlargement in size of the front portion of the vehicle 1 while preventing or further reducing the intrusion of foreign matter into the linkage 5.

The preferred embodiments that have been described above are intended to facilitate the understanding of the present invention and is not intended to limit the present invention. Preferred embodiments of the present invention can be modified without departing from the scope thereof and that their equivalents can also be included in the present invention.

In the preferred embodiments described above, the left side cover 224 is preferably supported on the left suspension 7, and the right side cover 225 is preferably supported on the right suspension 8. However, a configuration may be used in which the left side cover 224 is attached to the left side member 53 and the right side cover 225 is attached to the right side member 54.

According to this configuration, as the linkage 5 operates, the left side cover 224 is displaced together with the left side member 53 relative to the body frame 21, and the right side cover 225 is displaced together with the right side member 54 relative to the body frame 21. In other words, the relative position of the left side cover 224 to the left side member 53 and the relative position of the right side cover 225 to the right side member 54 do not change substantially even though the linkage 5 operates. Consequently, the left side cover 224 and the right side cover 225 do not have to continue to cover the entire portions that need to be protected at all times and hence should have a required minimum area. In addition, since the relative positions do not change substantially even though the linkage 5 operates, there is no need to consider the interference of the left side cover 224 with the left side member 53 and the interference of the right side cover 225 with the right side member 54. Consequently, the left side cover 224 and the right side cover 225 are easily disposed closely to the portion required to be protected. As a result, it is possible to prevent the enlargement in size of the front portion of the vehicle 1 while enabling the prevention or reduction of intrusion of foreign matter into the linkage 5.

In the preferred embodiments described above, the left side cover 224 preferably covers both the upper edge 52LU and the lower edge 52LD of the left lower projection 52L from the left in the left-right direction of the body frame 21, as viewed from the left in the left-right direction of the body frame 21. However, the covering range of the left side cover 224 in such a state that the body frame 21 is in the upright state may be changed as required.

For example, as shown in FIG. 12, a left side cover 224A is provided which covers only the lower edge 52LD of the left lower projection 52L from the left in the left-right direction of the body frame 21, as viewed from the left in the left-right direction of the body frame 21. This left side cover 224A may be attached to the left side member 53 via the lower left connector 53b. In addition, the left side cover 224A may be extended downwards so as to cover the gap 52LG defined between the left lower projection 52L of the lower cross member 52 and the left outer portion 7L of the left suspension 7 from the left.

Alternatively, a left side cover 224B may be provided which covers at least a portion of the left upper projection 51L of the upper cross member 51 in addition to the upper edge 52LU and the lower edge 52LD of the left lower projection 52L as viewed from the left in the left-right direction of the body frame 21. The left upper projection 51L is defined as the portion of the upper cross member 51 which is disposed on the left of the left end 53L of the left side member 53.

In the preferred embodiments described above, the right side cover 225 preferably covers both the upper edge 52RU and the lower edge 52RD of the right lower projection 52R from the right in the left-right direction of the body frame 21, as viewed from the right in the left-right direction of the body frame 21. However, the covering range of the right side cover 225 in such a state that the body frame 21 is in the upright state may be changed as required.

For example, as shown in FIG. 12, a right side cover 225A may be provided which covers only the lower edge 52RD of the right lower projection 52R from the right in the left-right direction of the body frame 21, as viewed from the right in the left-right direction of the body frame 21. This right side cover 225A may be attached to the right side member 54 via the lower right connector 54b. In addition, the right side cover 225A may be extended downwards so as to cover the gap 52RG defined between the right lower projection 52R of the lower cross member 52 and the right outer portion 8R of the right suspension 8 from the right.

Alternatively, a right side cover 225B may be provided which covers at least a portion of the right upper projection 51R of the upper cross member 51 in addition to the upper edge 52RU and the lower edge 52RD of the right lower projection 52R as viewed from the right in the left-right direction of the body frame 21. The right upper projection 51R is defined as the portion of the upper cross member 51 which is disposed on the right of the right end 54R of the right side member 54.

For example, as shown in FIG. 12, in addition to the left side cover 224A, a left side cover 224C (an example of a third left cover) may be provided. The left side cover 224C may be attached to the left side member 53. The left side cover 224C covers only the upper edge 52LU of the left lower projection 52L from the left in the left-right direction of the body frame 21 at least temporarily when the body frame 21 is caused to lean from the upright state to the left at the maximum angle, as viewed from the left in the left-right direction of the body frame 21. The left side cover 224C may cover at least a portion of the left upper projection 51L of the upper cross member 51 in addition to the upper edge 52LU of the left lower projection 52L as viewed from the left in the left-right direction of the body frame 21.

Likewise, in addition to the right side cover 225A, a right side cover 225C (an example of a third right cover) may be provided. The right side cover 225C may be attached to the right side member 54. The right side cover 225C covers only the upper edge 52RU of the right lower projection 52R from the right in the left-right direction of the body frame 21 at least temporarily when the body frame 21 is caused to lean from the upright state to the right at the maximum angle, as viewed from the right in the left-right direction of the body frame 21. The right side cover 225C may cover at least a portion of the right upper projection 51R of the upper cross member 51 in addition to the upper edge 52RU of the right lower projection 52R as viewed from the right in the left-right direction of the body frame 21.

According to this configuration, the portions where the intrusion of foreign matter into the linkage 5 is desired to be prevented or significantly reduced are covered with covers of having a minimum size. Consequently, it is possible to further prevent the enlargement in size of the front portion of the vehicle 1 while preventing or reducing the intrusion of foreign matter into the linkage 5.

For example, as shown in FIG. 12, in addition to the left side cover 224 and the left side cover 224A, a left side cover 224D (an example of a fourth left cover) may be provided. The left side cover 224D may be attached to the left side member 53. The left side cover 224D covers at least a portion of the left upper projection 51L of the upper cross member 51 from the left in the left-right direction of the body frame 21, as viewed from the left in the left-right direction of the body frame 21. In addition to the left side cover 224D, the left side cover 224C may be provided.

Likewise, in addition to the right side cover 225 and the right side cover 225A, a right side cover 225D (an example of a fourth right cover) may be provided. The right side cover 225D may be attached to the right side member 54. The right side cover 225D covers at least a portion of the right upper projection 51R of the upper cross member 51 from the right in the left-right direction of the body frame 21, as viewed from the right in the left-right direction of the body frame 21. In addition to the right side cover 225D, the right side cover 225C may be provided.

According to this configuration, the portions where the intrusion of foreign matter into the linkage 5 is desired to be prevented or significantly reduced are covered with covers having a minimum size. Consequently, it is possible to further prevent the enlargement in size of the front portion of the vehicle 1 while preventing or reducing the intrusion of foreign matter into the linkage 5.

In the preferred embodiments described above, the left side cover 224 covers the lower edge 52LD of the left lower projection 52L of the lower cross member 52 from the left in the left-right direction of the body frame 21 at all times when the body frame 21 is caused to lean from the upright state to the right at the maximum angle, as viewed from the left in the left-right direction of the body frame 21. However, the left side cover 224 may cover at least a portion of the lower edge 52LD of the left lower projection 52L of the lower cross member 52 from the left in the left-right direction of the body frame 21 at least temporarily when the body frame 21 is caused to lean from the upright state to the left at the maximum angle, as viewed from the left in the left-right direction of the body frame 21.

In the preferred embodiments described above, the right side cover 225 covers the lower edge 52RD of the right lower projection 52R of the lower cross member 52 from the right in the left-right direction of the body frame 21 at all times when the body frame 21 is caused to lean from the upright state to the left at the maximum angle, as viewed from the right in the left-right direction of the body frame 21. However, the right side cover 225 may cover at least a portion of the lower edge 52RD of the right lower projection 52R of the lower cross member 52 from the right in the left-right direction of the body frame 21 at least temporarily when the body frame 21 is caused from the upright state to the right at the maximum angle, as viewed from the right in the left-right direction of the body frame 21.

In the preferred embodiments described above, the left side cover 224 covers the gap 52LG between the left lower projection 52L of the lower cross member 52 and the left outer portion 7L of the left suspension 7 from the left in the left-right direction of the body frame 21 at all times when the body frame 21 is caused to lean from the upright state to the right at the maximum angle, as viewed from the left in the left-right direction of the body frame 21. However, the left side cover 224 may cover the gap 52LG between the left lower projection 52L of the lower cross member 52 and the left outer portion 7L of the left suspension 7 from at least the left in the left-right direction of the body frame 21 at least temporarily when the body frame 21 is caused to lean from the upright state to the left at the maximum angle, as viewed from the left in the left-right direction of the body frame 21.

In the preferred embodiments described above, the right side cover 225 covers the gap 52RG between the right lower projection 52R of the lower cross member 52 and the right outer portion 8R of the right suspension 8 from the right in the left-right direction of the body frame 21 at all times when the body frame 21 is caused to lean from the upright state to the left at the maximum angle, as viewed from the right in the left-right direction of the body frame 21. However, the right side cover 225 may cover the gap 52RG between the right lower projection 52R of the lower cross member 52 and the right outer portion 8R of the right suspension 8 from at least the right in the left-right direction of the body frame 21 at least temporarily when the body frame 21 is caused to lean from the upright state to the right at the maximum angle, as viewed from the right in the left-right direction of the body frame 21.

In the preferred embodiments described above, the front cover 221 that is unable to be displaced relative to the body frame 21 covers the portion where the upper edge 523U of the left connector 523 and the left side member 53 overlap each other from the left in the left-right direction of the body frame 21 at least temporarily when the body frame 21 is caused to lean from the upright state to the left at the maximum angle, as viewed from the left in the left-right direction of the body frame 21. However, the cover (an example of a second left cover) that covers the portion concerned at least temporarily when the body frame 21 is caused to lean from the upright state to the left at the maximum angle may be provided as an individual member from the front cover 221. It does not matter if the cover can be or cannot be displaced relative to the body frame 21.

In the preferred embodiments described above, the front cover 221 that is unable to be displaced relative to the body frame 21 covers the portion where the upper edge 524U of the right connector 524 and the right side member 54 overlap each other from the right in the left-right direction of the body frame 21 at least temporarily when the body frame 21 is caused to lean from the upright state to the right at the maximum angle, as viewed from the right in the left-right direction of the body frame 21. However, the cover (an example of a second right cover) that covers the portion concerned at a point in time in the period during which the body frame 21 is caused to lean from the upright state to the right at the maximum angle may be provided as an individual member from the front cover 221. It does not matter if the cover can be or cannot be displaced relative to the body frame 21.

In the above preferred embodiments, the vehicle 1 includes a single rear wheel 4. However, the vehicle 1 may include a plurality of rear wheels.

In the preferred embodiments described above, the upper cross member 51 is preferably a single plate member, while the lower cross member 52 includes the front element 521 and the rear element 522. However, a configuration may be used in which the upper cross member 51 also includes a front element and a rear element. A configuration may be used in which at least one of the upper cross member 51 and the lower cross member 52 includes a left plate member that is supported on the link support 212 and the left side member 53 and a right plate member that is supported on the link support 212 and the right side member 54.

In the above preferred embodiments, the handlebar 61 preferably includes a single member that extends in the left-right direction of the body frame. However, a configuration may be used in which the handlebar 61 includes a left handlebar portion to be operated by the left hand of the rider and a right handlebar portion to be operated by the right hand of the rider that are provided as individual members, as long as the steering force to turn the left front wheel 31 and the right front wheel 32 is inputted through the handlebar 61.

In the above preferred embodiments, the steering force transmission 9 includes the intermediate transmission plate 93, the left transmission plate 94, the right transmission plate 95, the intermediate joint 96, the left joint 97, the right joint 98, and the tie-rod 99. However, the intermediate transmission plate 93, the left transmission plate 94, the right transmission plate 95, the intermediate joint 96, the left joint 97, and the right joint 98 may be replaced by appropriate mechanisms such as universal joints as required, as long as the steering force inputted from the handlebar 61 is transmitted to the left suspension 7 and the right suspension 8 by way of the tie-rod 99.

The terms and expressions that are used in this description are used to describe the preferred embodiments of the present invention and hence should not be construed as limiting the scope of the present invention. It should be understood that any equivalents to the characteristic matters that are shown and described in this description should not be excluded and that various modifications made within the scope of claims to be made later are permitted.

When used in this description, the word "parallel" means that two straight lines which do not intersect each other as members while they are inclined at an angle falling within the range of about ±40 degrees are included therein. When used in this description to depict directions and members, the expression reading "along a certain direction" means that a case where something inclines at an angle falling within the range of about ±40 degrees relative to the certain direction is included therein. When used in this description, the expression reading "something extends in a certain direction" means that a case where something extends while being inclined at an angle falling within the range of about ±40 degrees relative to the certain direction is included therein.

When used in this description, the expression "so as not to be movable relative to the body frame 21" means that a certain portion or member is caused to lean in the left-right direction of the vehicle 1 together with the body frame 21 when the body frame 21 is caused to lean in the left-right direction of the vehicle 1. When used in this description, the expression "so as not to be movable relative to the body frame 21" may include not only a case where a certain portion or member is directly fixed to the body frame but also a case where the certain portion of member is fixed to a vehicle component (a fuel tank, a bracket, the power unit 24, etc.) which is fixed on the body frame 21. Here the term "fixed" may include a case that a certain portion or member is fixed by way of a damping member or the like.

The present invention can be implemented with many different preferred embodiments. This description should be understood to provide preferred embodiments of the present invention. The preferred embodiments which are at least described or illustrated in this description are so described or illustrated based on the understanding that the preferred embodiments are not intended to limit the present invention.

The present invention includes every preferred embodiment which includes an equivalent element, a modification, a deletion, a combination (for example, a combination of characteristics of various preferred embodiments), an improvement and an alteration which can be recognized by those skilled in the art to which the present invention pertains based on the preferred embodiments disclosed in this description. The limitative matters of claims should be construed broadly based on terms used in the claims and hence should not be limited by the preferred embodiments described in this specification or the prosecution of this patent application. Those preferred embodiments should be construed as non-exclusive. For example, in this description, the terms "preferable" and "may" should be construed as being non-exclusive, and those terms mean, respectively, that it is "preferable but not limited thereto" and that it "may be acceptable but not limited thereto."

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle comprising:
a body frame;
a left front wheel and a right front wheel that are arranged side by side in a left-right direction of the body frame; and
a linkage disposed above the left front wheel and the right front wheel in an up-down direction of the body frame, and that changes positions of the left front wheel and the right front wheel relative to the body frame to cause the body frame to lean to a left or a right of the vehicle; wherein
the linkage includes an upper cross member, a lower cross member, a left side member, and a right side member;
the upper cross member, the lower cross member, the left side member, and the right side member are connected such that the upper cross member and the lower cross member maintain postures that are parallel to each other, and such that the left side member and the right side member maintain postures that are parallel to each other;
the vehicle further includes:
a left suspension supporting the left front wheel and supported on the left side member;
a right suspension supporting the right front wheel and supported on the right side member;
a first left cover attached to one of the left side member and the left suspension; and
a first right cover attached to one of the right side member and the right suspension;
the lower cross member includes:
a left lower projection disposed on the left of a left end of the left side member; and
a right lower projection disposed on the right of a right end of the right side member;
the first left cover at least partially covers a lower edge of the left lower projection from the left in the left-right direction of the body frame at least temporarily when the body frame is caused to lean from an upright state to the right at a maximum angle, as viewed from the left in the left-right direction of the body frame; and
the first right cover at least partially covers a lower edge of the right lower projection from the right in the left-right direction of the body frame at least temporarily when the body frame is caused to lean from the upright state to the left at a maximum angle, as viewed from the right in the left-right direction of the body frame.

2. The vehicle according to claim 1, wherein
the left suspension includes a left outer portion extending in the left-right direction of the body frame to the left of the left end of the left side member;
the right suspension includes a right outer portion extending in the left-right direction of the body frame to the right of the right end of the right side member;
the first left cover covers a region defined by the lower edge of the left lower projection and an upper edge of the left outer portion at least from the left in the left-right direction of the body frame at least temporarily when the body frame is caused to lean from the upright state to the right at the maximum angle, as viewed from the left in the left-right direction of the body frame; and
the first right cover covers a region defined by the lower edge of the right lower projection and an upper edge of the right outer portion at least from the right in the left-right direction of the body frame at least temporarily when the body frame is caused to lean from the upright state to the left at the maximum angle, as viewed from the right in the left-right direction of the body frame.

3. The vehicle according to claim 2, wherein the first left cover is attached to the left outer portion of the left suspension, and the first right cover is attached to the right outer portion of the right suspension.

4. The vehicle according to claim 1, wherein
the left suspension includes:
a left upper portion supported on the left side member; and
a left lower portion supporting the left front wheel and that is movable upward and downward relative to the left upper portion;
the right suspension includes:

a right upper portion supported on the right side member; and a left lower portion supporting the right front wheel and that is movable upward and downward relative to the right upper portion;

the first left cover is attached to the left upper portion; and the first right cover is attached to the right upper portion.

5. The vehicle according to claim 1, wherein the left suspension is supported on the left side member so as to be able to turn relative to the left side member;

the right suspension is supported on the right side member so as to be able to turn relative to the right side member;

the vehicle further includes:

a steering member connected to the body frame so as to be able to turn about a steering axis; and a steering force transmission that turns the left suspension and the right suspension in a direction that the steering member is turned;

the first left cover is attached to the left suspension; and the first right cover is attached to the right suspension.

6. The vehicle according to claim 1, wherein the lower cross member is connected to a lower intermediate connector of the body frame so as to be able to turn about a lower intermediate connecting axis;

the lower cross member includes:

a front element disposed directly ahead of the lower intermediate connector in a direction along the lower intermediate connecting axis; and a rear element directly behind the lower intermediate connector in the direction along the lower intermediate connecting axis;

the left lower projection includes a left connector connecting the front element and the rear element at a position directly on the left of the left side member in the left-right direction of the body frame;

the right lower projection includes a right connector connecting the front element and the rear element at a position directly on the right of the right side member in the left-right direction of the body frame;

the first left cover covers a portion where a lower edge of the left connector overlaps the left side member at least from the left in the left-right direction of the body frame, as viewed from the left in the left-right direction of the body frame; and the first right cover covers a portion where a lower edge of the right connector overlaps the right side member at least from the right in the left-right direction of the body frame, as viewed from the right in the left-right direction of the body frame.

7. The vehicle according to claim 6, wherein the first left cover covers the portion where the lower edge of the left connector overlaps the left side member at least from the left in the left-right direction of the body frame at least temporarily when the body frame is caused to lean from the upright state to the right at the maximum angle, as viewed from the left in the left-right direction of the body frame; and the first right cover covers the portion where the lower edge of the right connector overlaps the right side member at least from the right in the left-right direction of the body frame at least temporarily when the body frame is caused to lean from the upright state to the left at the maximum angle, as viewed from the right in the left-right direction of the body frame.

8. The vehicle according to claim 6, further comprising:

a second left cover that covers a portion where an upper edge of the left connector overlaps the left side member at least from the left in the left-right direction of the body frame at least temporarily when the body frame is caused to lean from the upright state to the left at the maximum angle, as viewed from the left in the left-right direction of the body frame; and a second right cover that covers a portion where an upper edge of the right connector overlaps the right side member at least from the right in the left-right direction of the body frame at least temporarily when the body frame is caused to lean from the upright state to the right at the maximum angle, as viewed from the right in the left-right direction of the body frame.

9. The vehicle according to claim 1, further comprising:

a front cover that is not movable relative to the body frame, and at least partially covering the linkage; wherein the first left cover is at least partially positioned inside of the front cover at least temporarily when the body frame is caused to lean from the upright state to the left at the maximum angle; and the first right cover is at least partially positioned inside of the front cover at least temporarily when the body frame is caused to lean from the upright state to the right at the maximum angle.

10. The vehicle according to claim 9, wherein an upper edge of the left lower projection is at least partially covered with the front cover at least when the body frame is caused to lean to the left at the maximum angle, as viewed from the left in the left-right direction of the body frame; and an upper edge of the right lower projection is at least partially covered with the front cover at least when the body frame is caused to lean to the right at the maximum angle, as viewed from the right in the left-right direction of the body frame.

11. The vehicle according to claim 1, wherein the first left cover at least partially covers an upper edge of the left lower projection from the left in the left-right direction of the body frame at least temporarily when the body frame is caused to lean from the upright state to the left at the maximum angle, as viewed from the left in the left-right direction of the body frame; and the first right cover at least partially covers an upper edge of the right lower projection from the right in the left-right direction of the body frame at least temporarily when the body frame is caused to lean from the upright state to the right at the maximum angle, as viewed from the right in the left-right direction of the body frame.

12. The vehicle according to claim 11, wherein the upper cross member includes:

a left upper projection disposed on the left of the left end of the left side member; and a right upper projection on the right of the right end of the right side member; wherein the first left cover at least partially covers the left upper projection from the left in the left-right direction of the body frame; and the first right cover at least partially covers the right upper projection from the right in the left-right direction of the body frame.

13. The vehicle according to claim 1, further comprising:

a third left cover attached to the left side member, and that at least partially covers an upper edge of the left lower projection from the left in the left-right direction of the body frame at least temporarily when the body frame is caused to lean from the upright state to the left at the maximum angle, as viewed from the left in the left-right direction of the body frame; and a third right cover attached to the right side member, and that at least partially covers an upper edge of the right lower projection from the right in the left-right direction of the body frame at least temporarily when the body frame is caused to lean from the upright state to the right at the maximum angle, as viewed from the right in the left-right direction of the body frame.

14. The vehicle according to claim 1, wherein the upper cross member includes:

a left upper projection disposed on the left of the left end of the left side member; and a right upper projection on the right of the right end of the right side member;

the vehicle further includes:

a fourth left cover attached to the left side member, and that at least partially covers the left upper projection from the left in the left-right direction of the body frame; and a fourth right cover attached to the right side member, and that at least partially covers the right upper projection from the right in the left-right direction of the body frame.

* * * * *